United States Patent
Jo

(10) Patent No.: US 11,433,941 B2
(45) Date of Patent: Sep. 6, 2022

(54) APPARATUS AND METHOD FOR PROCESSING SENSOR SIGNAL, AND STEERING CONTROL APPARATUS

(71) Applicant: MANDO CORPORATION, Gyeonggi-do (KR)

(72) Inventor: So Young Jo, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 867 days.

(21) Appl. No.: 16/057,796

(22) Filed: Aug. 7, 2018

(65) Prior Publication Data
US 2019/0077442 A1 Mar. 14, 2019

(30) Foreign Application Priority Data

Sep. 11, 2017 (KR) .......................... 10-2017-0116015

(51) Int. Cl.
| | |
|---|---|
| B60W 10/20 | (2006.01) |
| B60W 50/02 | (2012.01) |
| B62D 5/04 | (2006.01) |
| B62D 6/00 | (2006.01) |
| G07C 5/08 | (2006.01) |
| H02P 6/16 | (2016.01) |

(52) U.S. Cl.
CPC .............. B62D 5/049 (2013.01); B62D 6/008 (2013.01); G07C 5/0808 (2013.01); H02P 6/16 (2013.01); *H02P 2203/05* (2013.01)

(58) Field of Classification Search
CPC .......... B62D 5/049; B62D 6/008; B62D 6/00; G07C 5/0808; H02P 6/16; H02P 2203/05

USPC .......................................................... 701/43
See application file for complete search history.

(56) References Cited

U.S. PATENT DOCUMENTS

| | | | |
|---|---|---|---|
| 4,972,320 A | 11/1990 | Sugiura et al. | |
| 5,222,065 A * | 6/1993 | Krogmann ............... | G05B 9/03 714/38.12 |
| 2009/0026004 A1* | 1/2009 | Hidaka .................. | B62D 5/049 180/446 |

(Continued)

FOREIGN PATENT DOCUMENTS

| | | |
|---|---|---|
| CN | 103298687 | 9/2013 |
| CN | 104210542 | 12/2014 |

(Continued)

OTHER PUBLICATIONS https://www.fierceelectronics.com/components/dual-die-hall-sensors-redundancy-function-address-safety-critical-automotive (Year: 2016).*

(Continued)

*Primary Examiner* — Abby Y Lin
*Assistant Examiner* — Hossam M Abd El Latif
(74) *Attorney, Agent, or Firm* — Ladas & Parry, LLP

(57) ABSTRACT

The present embodiment relates to an apparatus and method for processing a sensor signal and a steering control apparatus. In the sensor signal processing apparatus, an abnormality test is performed on three or more sensor signals (e.g., motor position sensor signals) by a sensor signal test module, and by the sensor signal selection module, a main sensor signal (e.g., a main normal motor position sensor signal) is selected on the basis of normal sensor signals (e.g., normal motor position sensor signals), validity of the selected main sensor signal is determined, and an output of the selected main sensor signal is controlled.

17 Claims, 11 Drawing Sheets

(56) References Cited

U.S. PATENT DOCUMENTS

| | | | | |
|---|---|---|---|---|
| 2019/0006979 A1* | 1/2019 | Suzuki | ................. | B62D 5/0484 |
| 2019/0028046 A1* | 1/2019 | Aoki | .................... | H02H 7/0844 |
| 2020/0023887 A1* | 1/2020 | Sasaki | ................. | B62D 5/0403 |
| 2021/0226572 A1* | 7/2021 | Suzuki | ................... | H02P 27/12 |

FOREIGN PATENT DOCUMENTS

| | | | | |
|---|---|---|---|---|
| CN | 106168519 | | 11/2016 | |
| JP | 2006-335252 | | 12/2006 | |
| JP | 2009-29217 | | 2/2009 | |
| JP | 2017165314 A | * | 9/2017 | .............. G01L 3/10 |
| KR | 1991-0006524 | | 8/1991 | |

OTHER PUBLICATIONS

Office Action dated Feb. 1, 2019 for Korean Patent Application No. 10-2017-0116015 and its English machine translation by Google Translate.

Office Action dated Dec. 27, 2021 for Chinese Patent Application No. 201811054294.0 and its English machine translation from Global Dossier.

* cited by examiner

APPARATUS AND METHOD FOR PROCESSING SENSOR SIGNAL, AND STEERING CONTROL APPARATUS

CROSS REFERENCE TO RELATED APPLICATION

This application claims priority from Korean Patent Application No. 10-2017-0116015, filed on Sep. 11, 2017, which is hereby incorporated by reference for all purposes as if fully set forth herein.

BACKGROUND OF THE INVENTION

1. Field of the Invention

The present embodiment relates to a sensor system, and more particularly to an apparatus and method for processing a sensor signal and a steering control apparatus using the same.

2. Description of the Prior Art

Generally, a sensor system may refer to a system which processes a sensor signal measured by a sensor and uses the processed sensor signal. Recently, due to a sharp increase in the number of sensors to which such a sensor system is applied, there has been an increasing demand for reliability as well as for redundancy of sensor signals.

Particularly, due to the application of autonomous-driving technology to vehicles, such a sensor system has suddenly become an important technology for a steering system of the vehicles.

The steering system refers to a system which allows a steering angle of a vehicle wheel to be changed on the basis of a steering force (or rotary force) applied to a steering wheel by a driver of the vehicle. Recently, electric power steering (EPS), i.e., electric power steering system, has been applied to vehicles in order to reduce a steering force of a steering wheel and guarantee stability of a steering state.

The electric power steering system drives a motor using sensor signals measured by a sensor mounted in a vehicle and is able to provide an optimal steering state such that a light and comfortable steering feeling is provided to a driver of the vehicle during low-speed traveling, a heavy and safe steering feeling is provided to the driver of the vehicle during high-speed traveling, and the driver of the vehicle is allowed to perform rapid steering in case of emergency.

As described above, the electric power steering system drives a motor using sensor signals measured by a sensor mounted in a vehicle. Accordingly, there has been an increasing demand for reliability as well as for redundancy of sensor signals even regarding the steering system of vehicles.

SUMMARY OF THE INVENTION

The present embodiment has been devised to solve the foregoing problem, and an aspect of the present embodiment provides a sensor signal processing apparatus capable of satisfying a demand for reliability as well as for redundancy of sensor signals.

To solve the foregoing problem, an aspect of the present embodiment provides a sensor signal processing method capable of satisfying a demand for reliability as well as for redundancy of sensor signals.

To solve the foregoing problem, an aspect of the present embodiment provides a steering control apparatus capable of satisfying a demand for reliability as well as for redundancy of sensor signals.

To achieve the foregoing aspects, an aspect of the present embodiment provides a sensor signal processing apparatus including a sensor signal test module configured to receive a sensor signal from each of at least three or more sensors and perform an abnormality test on the received sensor signals, and a sensor signal selection module configured to receive the sensor signals on which the abnormality test has been performed from the sensor signal test module, determine the received sensor signals as normal sensor signals and abnormal sensor signals, select a main sensor signal on the basis of the determined normal sensor signals, determine validity of the selected main sensor signal, and control an output of the selected main sensor signal.

To achieve the foregoing aspects, an aspect of the present embodiment provides a sensor signal processing method including receiving a sensor signal from at least three or more sensors, performing an abnormality test on the received sensor signals, and determining the sensor signals on which the abnormality test has been performed as normal sensor signals and abnormal sensor signals, selecting a main sensor signal on the basis of the determined normal sensor signals, determining validity of the selected main sensor signal, and controlling an output of the selected main sensor signal.

To achieve the foregoing aspects, an aspect of the present embodiment provides a steering control apparatus including a sensor module configured to measure a position of a steering motor using at least three or more motor position sensors and generate motor position sensor signals on the basis of the measurement, a sensor signal processing module configured to receive the motor position sensor signals from the sensor module, determine the received motor position sensor signals as normal motor position sensor signals and abnormal motor position sensor signals, select a main motor position sensor signal on the basis of the determined normal motor position sensor signals, determine validity of the selected main motor position sensor signal, and control an output of the selected main motor position sensor signal, and a steering motor control module configured to receive the output-controlled main motor position sensor signal from the sensor signal processing module, generate an steering assist force on the basis of the received output-controlled main motor position sensor signal, and use the generated steering assist force to control an operation of the steering motor.

As described above, according to the sensor signal processing apparatus of the present embodiment, an abnormality test is performed on three or more sensor signals (e.g., motor position sensor signals) by the sensor signal test module, and by the sensor signal selection module, a main sensor signal (e.g., a main normal motor position sensor signal) is selected on the basis of normal sensor signals (e.g., normal motor position sensor signals), validity of the selected main sensor signal is determined, and an output of the selected main sensor signal is controlled. In this way, in comparison to when sensor signals are output using two sensor signals, sensor signals can be output using three or more sensor signals such that, while a demand for redundancy of the sensor signals can be satisfied, a demand for reliability of the sensor signals can be satisfied due to the main sensor signal being output after the abnormality test is performed on the sensor signals and validity of the main sensor signal is determined.

According to the present embodiment, three or more sensor signals (e.g., motor position sensor signals) are measured by the sensor module, an abnormality test is performed on the three or more sensor signals, a main sensor signal (e.g., a main normal motor position sensor signal) is selected on the basis of the abnormality test, validity of the selected main sensor signal is determined, and an output of the selected main sensor signal is controlled by the sensor signal processing module, and the output-controlled main sensor signal is used by the steering motor control module to control an operation of the steering motor. In this way, in comparison to when the steering motor is controlled by outputting sensor signals using two sensor signals, the steering motor can be controlled by outputting sensor signals using three or more sensor signals such that, while a demand for redundancy regarding the steering control can be satisfied, a demand for reliability regarding the steering control can also be satisfied due to the steering motor being controlled by outputting the main sensor signal after the abnormality test is performed on the sensor signals and validity of the main sensor signal is determined.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
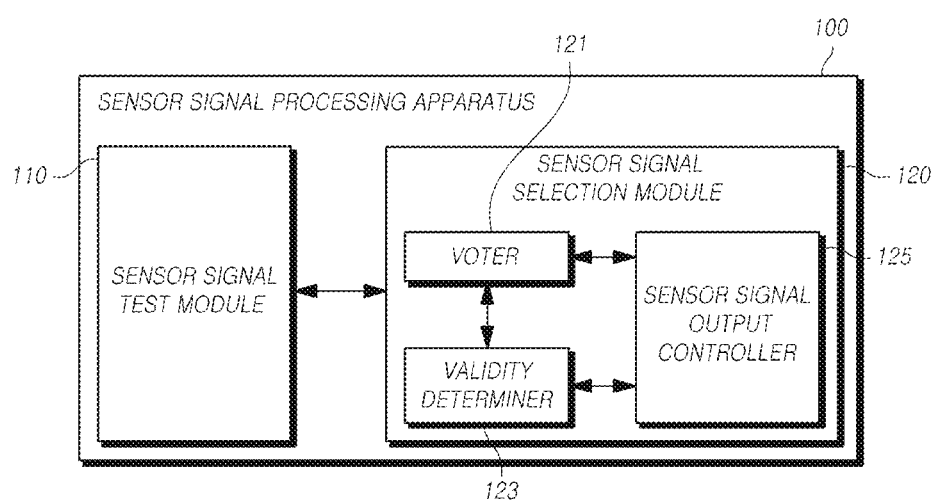
FIG. 1 is an overall block diagram for describing a sensor signal processing apparatus according to the present embodiment.

Hereinafter, advantages and features of the present embodiment and a method of achieving the same should become clear with embodiments described in detail below with reference to the accompanying drawings. However, the present embodiment is not limited to embodiments disclosed below and is realized in various other forms. The present embodiments make the disclosure of the present embodiment complete and are provided to completely inform one of ordinary skill in the art to which the present embodiment pertains of the scope of the invention. The present embodiment is defined only by the scope of the claims. Like reference numerals refer to like elements throughout. The term "and/or" includes each and every combination of one or more of mentioned items.

Although terms including ordinals such as first and second are used to describe various devices, elements, and/or sections, such devices, elements, and/or sections are not limited by the terms. The terms are only used for the purpose of distinguishing one device, element, or section from another device, element, or section. Consequently, a first device, first element, or first section mentioned below may also be referred to as a second device, second element, or second section within the technical idea of the present embodiment.

Terms used herein are for describing the embodiments and are not intended to limit the present embodiment. In the specification, a singular expression includes a plural expression unless the context clearly indicates otherwise. "Comprises" and/or "comprising" used herein do not preclude the existence or the possibility of adding one or more elements, steps, operations, and/or devices other than those mentioned.

Unless otherwise defined, all terms including technical or scientific terms used herein have the same meaning as commonly understood by one of ordinary skill in the art to which the present embodiment pertains. Terms, such as those defined in commonly used dictionaries, are not to be construed in an idealized or overly formal sense unless expressly so defined herein.

In describing embodiments of the present embodiment, when it is determined that detailed description of a known function or configuration may unnecessarily blur the gist of the present embodiment, the detailed description will be omitted. The terms used below have been defined in consideration of functions in embodiments of the present embodiment and may vary in accordance with an intention, practice, or the like of a user or an operator. Therefore, the terms should be defined on the basis of content throughout the specification.

Hereinafter, a sensor signal processing apparatus according to the present embodiment will be described with reference to the accompanying drawings.

FIG. 1 is an overall block diagram for describing a sensor signal processing apparatus according to the present embodiment.

Referring to FIG. 1, a sensor signal processing apparatus 100 according to the present embodiment may mainly include a sensor signal test module 110 and a sensor signal selection module 120.

The sensor signal test module 110 may be connected to a sensor. For example, the sensor signal test module 110 may be connected to at least three or more sensors. The sensor signal test module 110 may receive a sensor signal from each of the at least three or more sensors.

The sensor may include at least one of a position sensor (e.g., a motor position sensor), a speed sensor (e.g., a vehicle speed sensor), a torque sensor, an angle sensor (e.g., a steering angle sensor), an illuminance sensor, a rain sensor, a snow sensor, a camera sensor, a radar sensor, a light detection and ranging (lidar) sensor, a pressure sensor, a Hall sensor, and a flow rate sensor, but the sensor is not limited thereto and may include any sensor capable of sensing a physical amount or a change therein.

The sensor signal test module 110 may perform an abnormality test on the sensor signal received from each of the at least three or more sensors. Also, the sensor signal test module 110 may provide the sensor signals, on which the abnormality test has been performed, to the sensor signal selection module 120 which will be described below.

In one example, the sensor signal test module 110 may perform the abnormality test on the sensor signals received from the at least three or more sensors, and when the sensor signals are normal according to the result of the test, generate a sensor signal which does not include single sensor fault information and provide the generated sensor signal to the sensor signal selection module 120.

In another example, the sensor signal test module 110 may perform the abnormality test on the sensor signals received from the at least three or more sensors, and when the sensor signals are abnormal according to the result of the test, generate a sensor signal which includes single sensor fault information and provide the generated sensor signal to the sensor signal selection module 120.

In this case, the single sensor fault information may be information which indicates validity (or abnormality) of a sensor signal. For example, the single sensor fault information may be information generated when at least one of a sensor failure, a sensor signal time-out, and a sensor signal error has occurred. Particularly, the single sensor fault information may be generated when the above-described cause has occurred, but embodiments are not limited thereto, and the single sensor fault information may be generated due to any cause as long as validity of a sensor signal can be determined therefrom.

The sensor signal selection module 120 may be connected to the sensor signal test module 110. The sensor signal selection module 120 may receive the sensor signals, on which the abnormality test has been performed, from the sensor signal test module 110.

The sensor signal selection module 120 may determine the sensor signals, on which the abnormality test has been performed, received from the sensor signal test module 110 as normal sensor signals and abnormal sensor signals.

In one example, the sensor signal selection module 120 may determine sensor signals in which a single sensor fault has not occurred from among the sensor signals, on which the abnormality test has been performed, received from the sensor signal test module 110 as the normal sensor signals.

In another example, the sensor signal selection module 120 may determine sensor signals in which a single sensor fault has occurred from among the sensor signals, on which the abnormality test has been performed, received from the sensor signal test module 110 as the abnormal sensor signals.

The sensor signal selection module 120 may select a main sensor signal on the basis of the determined normal sensor signal. In this case, the main sensor signal may be a sensor signal which is primary, i.e., is the highest priority, among the normal sensor signals. Particularly, the main sensor signal may be selected by pieces of preset sensor signal priority information.

For example, the sensor signal selection module 120 may match the determined normal sensor signals with the pieces of preset sensor signal priority information and select a normal sensor signal that matches highest priority information from among the pieces of sensor signal priority information according to the result of matching as the main sensor signal.

The sensor signal selection module 120 may determine validity of the sensor signal on the basis of the determined normal sensor signals. That is, the sensor signal selection module 120 may determine validity of the selected main sensor signal on the basis of the determined normal sensor signals.

In this case, in the determination of the validity of the main sensor signal, whether the main sensor signal is accurate may be checked. For example, the sensor signal selection module 120 may match the determined normal sensor signals with the preset pieces of sensor signal priority information, select normal sensor signals which match the highest priority information and the next priority information from among the pieces of sensor signal priority information according to the result of matching, compare the normal sensor signals, and determine validity of the normal sensor signal (i.e., the main sensor signal) which matches the highest priority information.

The sensor signal selection module 120 may control an output of the selected main sensor signal according to the result of determining the validity of the main sensor signal. In one example, the sensor signal selection module 120 may output the selected main sensor signal when the selected main sensor signal is valid according to the result of determining the validity of the main sensor signal.

In another example, the sensor signal selection module 120 may not output the selected main sensor signal or may output a fault signal (e.g., loss of assist (LOA) in a steering system) when the selected main sensor signal is invalid according to the result of determining the validity of the main sensor signal.

The above-described sensor signal selection module 120 may include a voter 121, a validity determiner 123, and a sensor signal output controller 125.

The voter 121 may be connected to the sensor signal test module 110. The voter 121 may receive the sensor signals, on which the abnormality test has been performed, from the sensor signal test module 110.

The voter 121 may determine the sensor signals, on which the abnormality test has been performed, received from the sensor signal test module 110 as normal sensor signals and abnormal sensor signals. In one example, the voter 121 may test the sensor signals, on which the abnormality test has been performed, received from the sensor signal test module 110 and determine sensor signals which do not include single sensor fault information according to the result of testing as the normal sensor signals.

In another example, the voter 121 may test the sensor signals, on which the abnormality test has been performed, received from the sensor signal test module 110 and determine sensor signals which include the single sensor fault information according to the result of testing as the abnormal sensor signals.

The voter 121 may select one of the sensor signals which have been determined as the normal sensor signals according to the result of determining the normal sensor signals and the abnormal sensor signals as a main sensor signal. The voter 121 may select another one of the sensor signals which have been determined as the normal sensor signals as a validity comparison signal.

For example, the voter 121 may match the determined normal sensor signals with preset pieces of sensor signal priority information and select normal sensor signals which match the highest priority information and the next priority information from among the pieces of sensor signal priority information according to the result of matching. Then, the voter 121 may select the normal sensor signal which matches the highest priority information as the main sensor signal. Then, the voter 121 may select the normal sensor signal which matches the next priority information as the validity comparison signal.

The validity determiner 123 may be connected to the voter 121. The validity determiner 123 may receive the validity comparison signal as well as the main sensor signal from the voter 121. The validity determiner 123 may compare the main sensor signal and the validity comparison signal received from the voter 121 and determine the validity of the main sensor signal according to the result of comparison.

That is, the validity determiner 123 may compare sizes of the main sensor signal and the validity comparison signal received from the voter 121 and determine the validity of the main sensor signal according to the result of comparison. In this case, the validity determiner 123 may also be referred to as a differential comparator.

In one example, the validity determiner 123 may compare sizes of the main sensor signal and the validity comparison signal received from the voter 121 and determine that the main sensor signal is valid when a difference between the sizes of the sensor signals is a preset validity value or less according to the result of comparison.

In another example, the validity determiner 123 may compare sizes of the main sensor signal and the validity comparison signal received from the voter 121 and determine that the main sensor signal is invalid when a difference between the sizes of the sensor signals exceeds the preset validity value according to the result of comparison.

In this case, the preset validity value may be a single value, but is not limited thereto, and may also include two or more values. The preset validity value may be modified and implemented.

As described above, the validity determiner 123 may determine the validity of the main sensor signal by using the size of the main sensor signal. However, embodiments are not limited thereto, and the validity determiner 123 may use any piece of information included in the main sensor signal as long as the validity of the main sensor signal can be determined therefrom.

The sensor signal output controller 125 may be connected to the voter 121. The sensor signal output controller 125 may receive the main sensor signal from the voter 121. The sensor signal output controller 125 may be connected to the validity determiner 123. The sensor signal output controller 125 may receive the result of determining the validity of the main sensor signal from the validity determiner 123.

The sensor signal output controller 125 may control an output of the main sensor signal received from the voter 121 according to the result of determining the validity of the main sensor signal that is received from the validity determiner 123. In one example, the sensor signal output controller 125 may output the main sensor signal when the main sensor signal is valid according to the result of determining the validity of the main sensor signal that is received from the validity determiner 123.

In another example, the sensor signal output controller 125 may not output the main sensor signal or may output a fault signal (e.g., LOA in a steering system) when the main sensor signal is invalid according to the result of determining the validity of the main sensor signal that is received from the validity determiner 123.

Referring to FIG. 1, the sensor signal test module 110 may be connected to at least three or more motor position sensors. The sensor signal test module 110 may receive a motor position sensor signal from each of the at least three or more motor position sensors.

The sensor signal test module 110 may perform an abnormality test on the motor position sensor signals received from the at least three or more motor position sensors. The sensor signal test module 110 may provide the motor position sensor signals, on which the abnormality test has been performed, to the voter 121 of the sensor signal selection module 120.

The sensor signal selection module 120 may include the voter 121, the validity determiner 123, and the sensor signal output controller 125.

The voter 121 may be connected to the sensor signal test module 110. The voter 121 may receive the motor position sensor signals, on which the abnormality test has been performed, from the sensor signal test module 110.

The voter 121 may determine the motor position sensor signals, on which the abnormality test has been performed, received from the sensor signal test module 110 as normal motor position sensor signals and abnormal motor position sensor signals. In one example, the voter 121 may test the motor position sensor signals, on which the abnormality test has been performed, received from the sensor signal test module 110 and determine motor position sensor signals which do not include single sensor fault information according to the result of testing as the normal motor position sensor signals.

In another example, the voter 121 may test the motor position sensor signals, on which the abnormality test has been performed, received from the sensor signal test module 110 and determine motor position sensor signals which include the single sensor fault information according to the result of testing as the abnormal motor position sensor signals.

The voter 121 may select one of the motor position sensor signals, which have been determined as the normal motor position sensor signals according to the result of determining the normal motor position sensor signals and the abnormal motor position sensor signals, as a main motor position sensor signal. The voter 121 may select another one of the motor position sensor signals, which have been determined as the normal motor position sensor signals according to the result of determining the normal motor position sensor signals and the abnormal motor position sensor signals, as a validity comparison signal.

For example, the voter 121 may match the determined normal motor position sensor signals with preset pieces of motor position sensor signal priority information and select normal motor position sensor signals which match the highest priority information and the next priority information from among the pieces of motor position sensor signal priority information according to the result of matching. Then, the voter 121 may select the normal motor position sensor signal which matches the highest priority information as the main motor position sensor signal. Then, the voter 121 may select the normal motor position sensor signal which matches the next priority information as the validity comparison signal.

The validity determiner 123 may be connected to the voter 121. The validity determiner 123 may receive the validity comparison signal as well as the main motor position sensor signal from the voter 121. The validity determiner 123 may compare the main motor position sensor signal and the validity comparison signal received from the voter 121 and determine the validity of the main motor position sensor signal according to the result of comparison.

That is, the validity determiner 123 may compare sizes of the main motor position sensor signal and the validity comparison signal received from the voter 121 and determine the validity of the main motor position sensor signal according to the result of comparison.

In one example, the validity determiner 123 may compare sizes of the main motor position sensor signal and the validity comparison signal received from the voter 121 and determine that the main motor position sensor signal is valid when a difference between the sizes of the motor position sensor signals is a preset validity value or less according to the result of comparison.

In another example, the validity determiner 123 may compare sizes of the main motor position sensor signal and the validity comparison signal received from the voter 121 and determine that the main motor position sensor signal is invalid when a difference between the sizes of the motor position sensor signals exceeds the preset validity value according to the result of comparison.

In this case, the preset validity value may be a single value, but is not limited thereto, and may also include two or more values. The preset validity value may be modified and implemented.

As described above, the validity determiner 123 may determine the validity of the main motor position sensor signal by using the size of the main motor position sensor signal. However, embodiments are not limited thereto, and the validity determiner 123 may use any piece of information included in the main motor position sensor signal as long as the validity of the main motor position sensor signal can be determined therefrom.

The sensor signal output controller 125 may be connected to the voter 121. The sensor signal output controller 125 may receive the main motor position sensor signal from the voter 121. The sensor signal output controller 125 may be connected to the validity determiner 123. The sensor signal output controller 125 may receive the result of determining the validity of the main motor position sensor signal from the validity determiner 123.

The sensor signal output controller 125 may control an output of the main motor position sensor signal received from the voter 121 according to the result of determining the validity of the main motor position sensor signal that is received from the validity determiner 123. In one example, the sensor signal output controller 125 may output the main motor position sensor signal when the main motor position sensor signal is valid according to the result of determining the validity of the main motor position sensor signal that is received from the validity determiner 123.

In another example, the sensor signal output controller 125 may not output the main motor position sensor signal or may output a fault signal (e.g., LOA in a steering system) when the main motor position sensor signal is invalid according to the result of determining the validity of the main motor position sensor signal that is received from the validity determiner 123.

Referring to FIG. 1, the sensor signal test module 110 may be connected to first to third motor position sensors. The sensor signal test module 110 may receive first to third motor position sensor signals from the first to third motor position sensors.

The sensor signal test module 110 may perform an abnormality test on the first to third motor position sensor signals received from the first to third motor position sensors. The sensor signal test module 110 may provide the first to third motor position sensor signals, on which the abnormality test has been performed, to the voter 121 of the sensor signal selection module 120.

The sensor signal selection module 120 may include the voter 121, the validity determiner 123, and the sensor signal output controller 125.

The voter 121 may be connected to the sensor signal test module 110. The voter 121 may receive the first to third motor position sensor signals, on which the abnormality test has been performed, from the sensor signal test module 110.

The voter 121 may determine the first to third motor position sensor signals, on which the abnormality test has been performed, received from the sensor signal test module 110 as normal motor position sensor signals and abnormal motor position sensor signals. In one example, the voter 121 may test the first to third motor position sensor signals, on which the abnormality test has been performed, received from the sensor signal test module 110 and determine motor position sensor signals which do not include single sensor fault information according to the result of testing as the normal motor position sensor signals.

In another example, the voter 121 may test the first to third motor position sensor signals, on which the abnormality test has been performed, received from the sensor signal test module 110 and determine motor position sensor signals which include the single sensor fault information according to the result of testing as the abnormal motor position sensor signals.

The voter 121 may select one of the motor position sensor signals, which have been determined as the normal motor position sensor signals according to the result of determining the normal motor position sensor signals and the abnormal motor position sensor signals, as a main motor position sensor signal. The voter 121 may select another one of the motor position sensor signals, which have been determined as the normal motor position sensor signals, as a validity comparison signal.

For example, the voter 121 may match the determined normal motor position sensor signals with preset pieces of motor position sensor signal priority information and select normal motor position sensor signals which match the highest priority information and the next priority information from among the pieces of motor position sensor signal priority information according to the result of matching. Then, the voter 121 may select the normal motor position sensor signal which matches the highest priority information as the main motor position sensor signal. Then, the voter 121 may select the normal motor position sensor signal which matches the next priority information as the validity comparison signal.

The validity determiner 123 may be connected to the voter 121. The validity determiner 123 may receive the validity comparison signal as well as the main motor position sensor signal from the voter 121. The validity determiner 123 may compare the main motor position sensor signal and the validity comparison signal received from the voter 121 and determine the validity of the main motor position sensor signal according to the result of comparison.

That is, the validity determiner 123 may compare sizes of the main motor position sensor signal and the validity comparison signal received from the voter 121 and determine the validity of the main motor position sensor signal according to the result of comparison.

In one example, the validity determiner 123 may compare sizes of the main motor position sensor signal and the validity comparison signal received from the voter 121 and determine that the main motor position sensor signal is valid when a difference between the sizes of the motor position sensor signals is a preset validity value or less according to the result of comparison.

In another example, the validity determiner 123 may compare sizes of the main motor position sensor signal and the validity comparison signal received from the voter 121 and determine that the main motor position sensor signal is invalid when a difference between the sizes of the motor position sensor signals exceeds the preset validity value according to the result of comparison.

In this case, the preset validity value may be a single value, but is not limited thereto, and may also include two or more values. The preset validity value may be modified and implemented.

As described above, the validity determiner 123 may determine the validity of the main motor position sensor signal by using the size of the main motor position sensor signal. However, embodiments are not limited thereto, and the validity determiner 123 may use any piece of information included in the main motor position sensor signal as long as the validity of the main motor position sensor signal can be determined therefrom.

The sensor signal output controller 125 may be connected to the voter 121. The sensor signal output controller 125 may receive the main motor position sensor signal from the voter 121. The sensor signal output controller 125 may be connected to the validity determiner 123. The sensor signal output controller 125 may receive the result of determining the validity of the main motor position sensor signal from the validity determiner 123.

The sensor signal output controller 125 may control an output of the main motor position sensor signal received from the voter 121 according to the result of determining the validity of the main motor position sensor signal that is received from the validity determiner 123. In one example, the sensor signal output controller 125 may output the main motor position sensor signal when the main motor position sensor signal is valid according to the result of determining the validity of the main motor position sensor signal that is received from the validity determiner 123.

In another example, the sensor signal output controller 125 may not output the main motor position sensor signal or may output a fault signal (e.g., LOA in a steering system) when the main motor position sensor signal is invalid according to the result of determining the validity of the main motor position sensor signal that is received from the validity determiner 123.

Referring to FIG. 1, the sensor signal test module 110 may be connected to first to third motor position sensors. The sensor signal test module 110 may receive first to third motor position sensor signals from the first to third motor position sensors.

In this case, the first and second motor position sensor signals from among the first to third motor position sensor signals provided from the first to third motor position sensors to the sensor signal test module 110 may be provided from the first and second motor position sensors disposed in a dual die.

In this case, the third motor position sensor signal from among the first to third motor position sensor signals provided from the first to third motor position sensors to the sensor signal test module 110 may be provided from the third motor position sensor disposed in a single die.

In this case, the second and third motor position sensor signals from among the first to third motor position sensor signals provided from the first to third motor position sensors to the sensor signal test module 110 may be values sampled in the same cycle. For example, the second and third motor position sensor signals may be values sampled in a 2 ms-cycle, but the sampling cycle is not limited thereto. The sampling cycle of the second and third motor position sensor signals may be modified and implemented.

In this case, the first motor position sensor signal from among the first to third motor position sensor signals provided from the first to third motor position sensors to the sensor signal test module 110 may be a value sampled in a shorter cycle than the second and third motor position sensor signals.

For example, the first motor position sensor signal may be a value sample in a 62.5 µs-cycle, but the sample cycle is not limited thereto. The sampling cycle of the first motor position sensor signal may be modified and implemented.

The sensor signal test module 110 may perform an abnormality test on the first to third motor position sensor signals received from the first to third motor position sensors. The sensor signal test module 110 may provide the first to third motor position sensor signals, on which the abnormality test has been performed, to the voter 121 of the sensor signal selection module 120.

The sensor signal selection module 120 may include the voter 121, the validity determiner 123, and the sensor signal output controller 125.

The voter 121 may be connected to the sensor signal test module 110. The voter 121 may receive the first to third motor position sensor signals, on which the abnormality test has been performed, from the sensor signal test module 110.

The voter 121 may determine the first to third motor position sensor signals, on which the abnormality test has been performed, received from the sensor signal test module 110 as normal motor position sensor signals and abnormal motor position sensor signals. In one example, the voter 121 may test the first to third motor position sensor signals, on which the abnormality test has been performed, received from the sensor signal test module 110 and determine motor position sensor signals which do not include single sensor fault information according to the result of testing as the normal motor position sensor signals.

In another example, the voter 121 may test the first to third motor position sensor signals, on which the abnormality test has been performed, received from the sensor signal test module 110 and determine motor position sensor signals which include the single sensor fault information according to the result of testing as the abnormal motor position sensor signals.

A sensor signal processing method according to the result of determining the first to third motor position sensor signals, on which the abnormality test has been performed, received from the sensor signal test module 110 as normal or abnormal will be described below.

According to the present embodiment, when the first and second motor position sensor signals are normal motor position sensor signals according to the result of determining the first to third motor position sensor signals, on which the abnormality test has been performed, received from the sensor signal test module 110 as normal or abnormal, the voter 121 may select the first motor position sensor signal as a main motor position sensor signal and select the second motor position sensor signal as a validity comparison signal.

The validity determiner 123 may be connected to the voter 121. The validity determiner 123 may receive the first and second motor position sensor signals from the voter 121. The validity determiner 123 may compare the first and second motor position sensor signals received from the voter 121 and determine the validity of the first motor position sensor signal according to the result of comparison.

That is, the validity determiner 123 may compare sizes of the first and second motor position sensor signals received from the voter 121 and determine the validity of the first motor position sensor signal according to the result of comparison.

In one example, the validity determiner 123 may compare sizes of the first and second motor position sensor signals received from the voter 121 and determine that the first motor position sensor signal is valid when a difference between the sizes of the first and second motor position sensor signals is a preset validity value or less according to the result of comparison.

In another example, the validity determiner 123 may compare sizes of the first and second motor position sensor signals received from the voter 121 and determine that the first motor position sensor signal is invalid when a difference between the sizes of the first and second motor position sensor signals exceeds the preset validity value according to the result of comparison.

In this case, the preset validity value may be a single value, but is not limited thereto, and may also include two or more values. The preset validity value may be modified and implemented.

As described above, the validity determiner 123 may determine the validity of the first motor position sensor signal by using the sizes of the first and second motor position sensor signals. However, embodiments are not limited thereto, and the validity determiner 123 may use any piece of information included in the first and second motor position sensor signals as long as the validity of the first motor position sensor signal can be determined therefrom.

The sensor signal output controller 125 may be connected to the voter 121. The sensor signal output controller 125 may receive the first motor position sensor signal from the voter 121. The sensor signal output controller 125 may be connected to the validity determiner 123. The sensor signal output controller 125 may receive the result of determining the validity of the first motor position sensor signal from the validity determiner 123.

The sensor signal output controller 125 may control an output of the first motor position sensor signal received from the voter 121 according to the result of determining the validity of the first motor position sensor signal that is received from the validity determiner 123. In one example, the sensor signal output controller 125 may output the first motor position sensor signal when the first motor position sensor signal is valid according to the result of determining the validity of the first motor position sensor signal that is received from the validity determiner 123.

In another example, the sensor signal output controller 125 may not output the first motor position sensor signal or may output a fault signal (e.g., LOA in a steering system) when the first motor position sensor signal is invalid according to the result of determining the validity of the first motor position sensor signal that is received from the validity determiner 123.

According to the present embodiment, when the first and third motor position sensor signals are normal motor position sensor signals according to the result of determining the first to third motor position sensor signals, on which the abnormality test has been performed, received from the sensor signal test module 110 as normal or abnormal, the voter 121 may select the first motor position sensor signal as the main motor position sensor signal and select the third motor position sensor signal as the validity comparison signal.

The validity determiner 123 may be connected to the voter 121. The validity determiner 123 may receive the first and third motor position sensor signals from the voter 121. The validity determiner 123 may compare the first and third motor position sensor signals received from the voter 121 and determine the validity of the first motor position sensor signal according to the result of comparison.

That is, the validity determiner 123 may compare sizes of the first and third motor position sensor signals received from the voter 121 and determine the validity of the first motor position sensor signal according to the result of comparison.

In one example, the validity determiner 123 may compare sizes of the first and third motor position sensor signals received from the voter 121 and determine that the first motor position sensor signal is valid when a difference between the sizes of the first and third motor position sensor signals is a preset validity value or less according to the result of comparison.

In another example, the validity determiner 123 may compare sizes of the first and third motor position sensor signals received from the voter 121 and determine that the first motor position sensor signal is invalid when a difference between the sizes of the first and third motor position sensor signals exceeds the preset validity value according to the result of comparison.

In this case, the preset validity value may be a single value, but is not limited thereto, and may also include two or more values. The preset validity value may be modified and implemented.

As described above, the validity determiner 123 may determine the validity of the first motor position sensor signal by using the sizes of the first and third motor position sensor signals. However, embodiments are not limited thereto, and the validity determiner 123 may use any piece of information included in the first and third motor position sensor signals as long as the validity of the first motor position sensor signal can be determined therefrom.

The sensor signal output controller 125 may be connected to the voter 121. The sensor signal output controller 125 may receive the first motor position sensor signal from the voter 121. The sensor signal output controller 125 may be connected to the validity determiner 123. The sensor signal output controller 125 may receive the result of determining the validity of the first motor position sensor signal from the validity determiner 123.

The sensor signal output controller 125 may control an output of the first motor position sensor signal received from the voter 121 according to the result of determining the validity of the first motor position sensor signal that is received from the validity determiner 123. In one example, the sensor signal output controller 125 may output the first motor position sensor signal when the first motor position sensor signal is valid according to the result of determining the validity of the first motor position sensor signal that is received from the validity determiner 123.

In another example, the sensor signal output controller 125 may not output the first motor position sensor signal or may output a fault signal (e.g., in a steering system) when the first motor position sensor signal is invalid according to the result of determining the validity of the first motor position sensor signal that is received from the validity determiner 123.

According to the present embodiment, when the second and third motor position sensor signals are normal motor position sensor signals according to the result of determining the first to third motor position sensor signals, on which the abnormality test has been performed, received from the sensor signal test module 110 as normal or abnormal, the voter 121 may select the third motor position sensor signal as the main motor position sensor signal and select the second motor position sensor signal as the validity comparison signal.

The validity determiner 123 may be connected to the voter 121. The validity determiner 123 may receive the second and third motor position sensor signals from the voter 121. The validity determiner 123 may compare the second and third motor position sensor signals received from the voter 121 and determine the validity of the third motor position sensor signal according to the result of comparison.

That is, the validity determiner 123 may compare sizes of the second and third motor position sensor signals received from the voter 121 and determine the validity of the third motor position sensor signal according to the result of comparison.

In one example, the validity determiner 123 may compare sizes of the second and third motor position sensor signals received from the voter 121 and determine that the third motor position sensor signal is valid when a difference between the sizes of the second and third motor position sensor signals is a preset validity value or less according to the result of comparison.

In another example, the validity determiner 123 may compare sizes of the second and third motor position sensor signals received from the voter 121 and determine that the third motor position sensor signal is invalid when a difference between the sizes of the second and third motor position sensor signals exceeds the preset validity value according to the result of comparison.

In this case, the preset validity value may be a single value, but is not limited thereto, and may also include two or more values. The preset validity value may be modified and implemented.

As described above, the validity determiner 123 may determine the validity of the third motor position sensor signal by using the sizes of the second and third motor position sensor signals. However, embodiments are not limited thereto, and the validity determiner 123 may use any piece of information included in the second and third motor position sensor signals as long as the validity of the third motor position sensor signal can be determined therefrom.

The sensor signal output controller 125 may be connected to the voter 121. The sensor signal output controller 125 may receive the third motor position sensor signal from the voter 121. The sensor signal output controller 125 may be connected to the validity determiner 123. The sensor signal output controller 125 may receive the result of determining the validity of the third motor position sensor signal from the validity determiner 123.

The sensor signal output controller 125 may control an output of the third motor position sensor signal received from the voter 121 according to the result of determining the validity of the third motor position sensor signal that is received from the validity determiner 123. In one example, the sensor signal output controller 125 may output the third motor position sensor signal when the third motor position sensor signal is valid according to the result of determining the validity of the third motor position sensor signal that is received from the validity determiner 123.

In another example, the sensor signal output controller 125 may not output the third motor position sensor signal or may output a fault signal (e.g., in a steering system) when the third motor position sensor signal is invalid according to the result of determining the validity of the third motor position sensor signal that is received from the validity determiner 123.

The above-described sensor signal processing apparatus according to the present embodiment may include an electronic control unit (ECU) or electric power steering (EPS), but embodiments are not limited thereto. The sensor signal processing apparatus may include any device capable of processing a sensor signal.

As described above, in the sensor signal processing apparatus according to the present embodiment, an abnormality test is performed on three or more sensor signals (e.g., motor position sensor signals) by the sensor signal test module, and by the sensor signal selection module, a main sensor signal (e.g., a main normal motor position sensor signal) is selected on the basis of normal sensor signals (e.g., normal motor position sensor signals), validity of the selected main sensor signal is determined, and an output of the selected main sensor signal is controlled. In this way, in comparison to when sensor signals are output using two sensor signals, sensor signals can be output using three or more sensor signals such that, while a demand for redundancy of the sensor signals can be satisfied, a demand for reliability of the sensor signals can be satisfied due to the main sensor signal being output after the abnormality test is performed on the sensor signals and validity of the main sensor signal is determined.

Hereinafter, a sensor signal processing method according to the present embodiment will be described with reference to the accompanying drawings. Particularly, for the simplicity of description, description of parts which overlap those of the sensor signal processing apparatus 100 according to the present embodiment which has been described above with reference to FIG. 1 will be omitted below.

Figure 2:
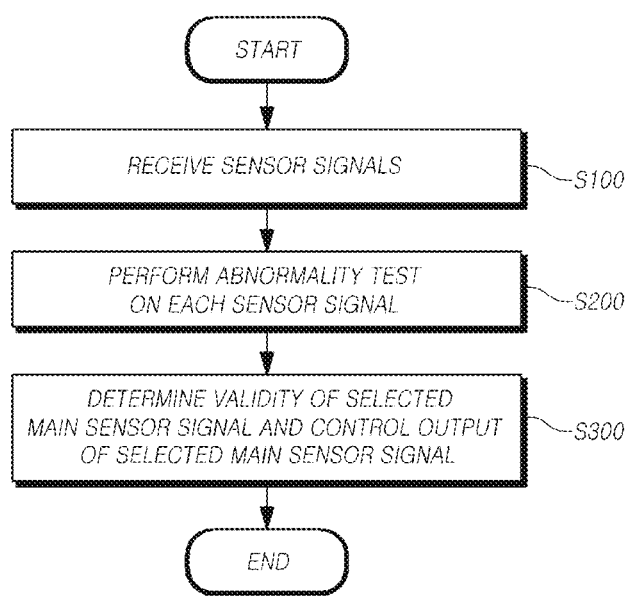
FIG. 2 is an overall flowchart for describing a sensor signal processing method according to the present embodiment.

FIG. 2 is an overall flowchart for describing a sensor signal processing method according to the present embodiment.

Referring to FIG. 2, the sensor signal processing method according to the present embodiment may include receiving sensor signals (S100), performing an abnormality test on each sensor signal (S200), and determining validity of a selected main sensor signal to control an output of the selected main sensor signal (S300).

Particularly, the sensor signal processing method according to the present embodiment may be performed using the apparatus (referred to as sensor signal processing apparatus) including the sensor signal test module and the sensor signal selection module.

In Operation S100, sensor signals may be received from at least three or more sensors (S100). For example, first, sensor signals may be provided by at least three or more sensors. Then, the sensor signals may be received from the at least three or more sensors by the sensor signal processing apparatus 100.

In Operation S200, the abnormality test may be performed on each of the received sensor signals (S200). For example, first, the abnormality test may be performed on the sensor signals received from Operation S100 by the sensor signal processing apparatus 100. Then, the sensor signals on which the abnormality test has been performed may be provided to Operation S300, which will be described below, by the sensor signal processing apparatus 100.

In one example, by the sensor signal processing apparatus 100, the abnormality test may be performed on the sensor signals received from Operation S100, and when the sensor signals are normal according to the result of testing, sensor signals which do not include single sensor fault information may be generated and provided to Operation S300, which will be described below.

In another example, by the sensor signal processing apparatus 100, the abnormality test may be performed on the sensor signals received from Operation S100, and when the sensor signals are abnormal according to the result of testing, sensor signals which include single sensor fault information may be generated and provided to Operation S300, which will be described below.

In Operation S300, the sensor signals on which the abnormality test has been performed may be determined as normal sensor signals and abnormal sensor signals, a main sensor signal may be selected on the basis of the determined normal sensor signals, the validity of the selected main sensor signal may be determined, and an output of the selected main sensor signal may be controlled (S300).

For example, first, the sensor signals on which the abnormality test has been performed may be received from Operation S200 by the sensor signal processing apparatus 100. Then, the sensor signals, on which the abnormality test has been performed, received from Operation S200 may be determined as normal sensor signals and abnormal sensor signals by the sensor signal processing apparatus 100.

In one example, sensor signals in which a single sensor fault has not occurred (that is, sensor signals which do not include the single sensor fault information) from among the sensor signals, on which the abnormality test has been performed, received from Operation S200 may be determined as the normal sensor signals by the sensor signal processing apparatus 100.

In another example, sensor signals in which a single sensor fault has occurred (that is, sensor signals which include the single sensor fault information) from among the sensor signals, on which the abnormality test has been performed, received from Operation S200 may be determined as the abnormal sensor signals by the sensor signal processing apparatus 100.

Then, a main sensor signal may be selected on the basis of the determined normal sensor signals by the sensor signal processing apparatus 100. For example, the determined normal sensor signals may be matched with pieces of preset sensor signal priority information, and a normal sensor signal which matches the highest priority information from among the pieces of sensor signal priority information according to the result of matching may be selected as the main sensor signal by the sensor signal processing apparatus 100.

Then, the validity of the sensor signal may be determined on the basis of the determined normal sensor signals by the sensor signal processing apparatus 100. For example, the validity of the selected main sensor signal may be determined on the basis of the determined normal sensor signals by the sensor signal processing apparatus 100.

Specifically, the determined normal sensor signals may be matched with preset pieces of sensor signal priority information, normal sensor signals which match the highest priority information and the next priority information from among the pieces of sensor signal priority information according to the result of matching may be selected, the normal sensor signals may be compared, and the validity of the normal sensor signal which matches the highest priority information (i.e., the main sensor signal) may be determined by the sensor signal processing apparatus 100.

Then, by the sensor signal processing apparatus 100, an output of the selected main sensor signal may be controlled in accordance with the result of determining the validity of the main sensor signal. In one example, when the selected main sensor signal is valid according to the result of determining the validity of the main sensor signal, the selected main sensor signal may be output by the sensor signal processing apparatus 100.

In another example, when the selected main sensor signal is invalid according to the result of determining the validity of the main sensor signal, the selected main sensor signal may not be output or a fault signal (e.g., LOA in a steering system) may be output by the sensor signal processing apparatus 100.

Figure 3:
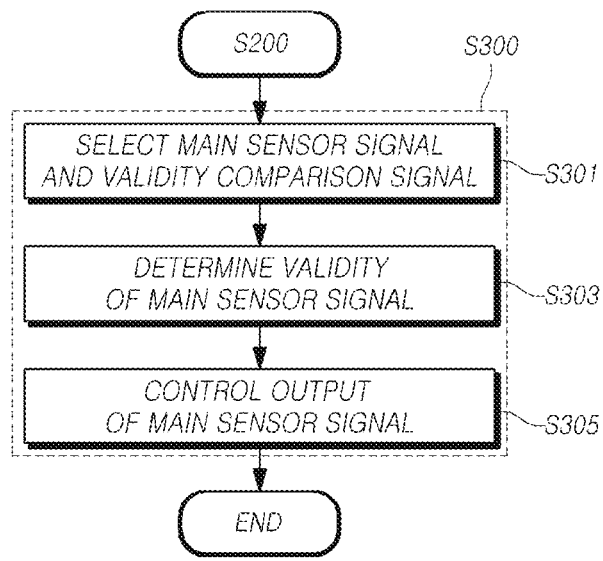
FIG. 3 is a detailed flowchart for describing a method in which validity of a selected main sensor signal is determined and an output of the selected main sensor signal is controlled according to the present embodiment.

FIG. 3 is a detailed flowchart for describing a method in which validity of a selected main sensor signal is determined and an output of the selected main sensor signal is controlled according to the present embodiment.

Referring to FIG. 3, the method in which validity of a selected main sensor signal is determined and an output of the selected main sensor signal is controlled according to the present embodiment may include selecting a main sensor signal and a validity comparison signal (S301), determining validity of the main sensor signal (S303), and controlling an output of the main sensor signal (S305).

Particularly, the method in which validity of a selected main sensor signal is determined and an output of the selected main sensor signal is controlled according to the present embodiment may be performed using the apparatus (referred to as sensor signal processing apparatus) including the sensor signal test module and the sensor signal selection module (which may include a voter, a validity determiner, and a sensor signal output controller).

In Operation S301, the sensor signals on which the abnormality test has been performed may be received and determined as normal sensor signals and abnormal sensor signals, one of the determined normal sensor signals may be selected as a main sensor signal, and another one of the determined normal sensor signals may be selected as a validity comparison signal (S301).

For example, first, the sensor signals on which the abnormality test has been performed may be received from Operation S200 by the sensor signal processing apparatus 100. Then, the sensor signals, on which the abnormality test has been performed, received from Operation S200 may be determined as normal sensor signals and abnormal sensor signals by the sensor signal processing apparatus 100.

In one example, by the sensor signal processing apparatus 100, the sensor signals, on which the abnormality test has been performed, received from Operation S200 may be tested, and sensor signals which do not include single sensor fault information according to the result of testing may be determined as the normal sensor signals.

In another example, by the sensor signal processing apparatus 100, the sensor signals, on which the abnormality test has been performed, received from Operation S200 may be tested, and sensor signals which include single sensor fault information according to the result of testing may be determined as the abnormal sensor signals.

Then, one of the sensor signals which have been determined as the normal sensor signals according to the result of determining the normal sensor signals and the abnormal sensor signals may be selected as the main sensor signal by the sensor signal processing apparatus 100. Another one of the determined normal sensor signals may be selected as the validity comparison signal by the sensor signal processing apparatus 100.

That is, by the sensor signal processing apparatus 100, the determined normal sensor signals may be matched with preset pieces of sensor signal priority information, and normal sensor signals which match the highest priority information and the next priority information from among the pieces of sensor signal priority information according to the result of matching may be selected. Then, by the sensor signal processing apparatus 100, the normal sensor signal which matches the highest priority information may be selected as the main sensor signal. Then, by the sensor signal processing apparatus 100, the normal sensor signal which matches the next priority information may be selected as the validity comparison signal.

In Operation S303, the main sensor signal and the validity comparison signal may be received, sizes of the main sensor signal and the validity comparison signal may be compared, and validity of the main sensor signal may be determined according to the result of comparison (S303).

For example, first, the main sensor signal and the validity comparison signal may be received from Operation S301 by the sensor signal processing apparatus 100. Then, by the sensor signal processing apparatus 100, the main sensor signal and the validity comparison signal received from Operation S301 may be compared, and the validity of the main sensor signal may be determined according to the result of comparison.

That is, by the sensor signal processing apparatus 100, the sizes of the main sensor signal and the validity comparison signal received from Operation S301 may be compared, and the validity of the main sensor signal may be determined according to the result of comparison.

In one example, by the sensor signal processing apparatus 100, the sizes of the main sensor signal and the validity comparison signal received from Operation S301 may be compared, and the main sensor signal may be determined as valid when a difference between the sizes of the sensor signals is a preset validity value or less according to the result of comparison.

In another example, by the sensor signal processing apparatus 100, the sizes of the main sensor signal and the validity comparison signal received from Operation S301 may be compared, and the main sensor signal may be determined as invalid when a difference between the sizes of the sensor signals exceeds the preset validity value according to the result of comparison.

In this case, the preset validity value may be a single value, but is not limited thereto, and may also include two or more values. The preset validity value may be modified and implemented.

In Operation S305, an output of the main sensor signal may be controlled according to the result of determining the validity of the main sensor signal (S305). For example, by the sensor signal processing apparatus 100, the main sensor signal may be received from Operation S301. Then, by the sensor signal processing apparatus 100, the result of determining the validity of the main sensor signal may be received from Operation S303.

Then, by the sensor signal processing apparatus 100, an output of the main sensor signal received from Operation S301 may be controlled according to the result of determining the validity of the main sensor signal that is received from Operation S303. In one example, when the main sensor signal is valid according to the result of determining the validity of the main sensor signal that is received from Operation S303, the main sensor signal received from Operation S301 may be output by the sensor signal processing apparatus 100.

In another example, when the main sensor signal is invalid according to the result of determining the validity of the main sensor signal that is received from Operation S303, the main sensor signal received from Operation S301 may not be output or a fault signal (e.g., LOA in a steering system) may be output by the sensor signal processing apparatus 100.

Figure 4:
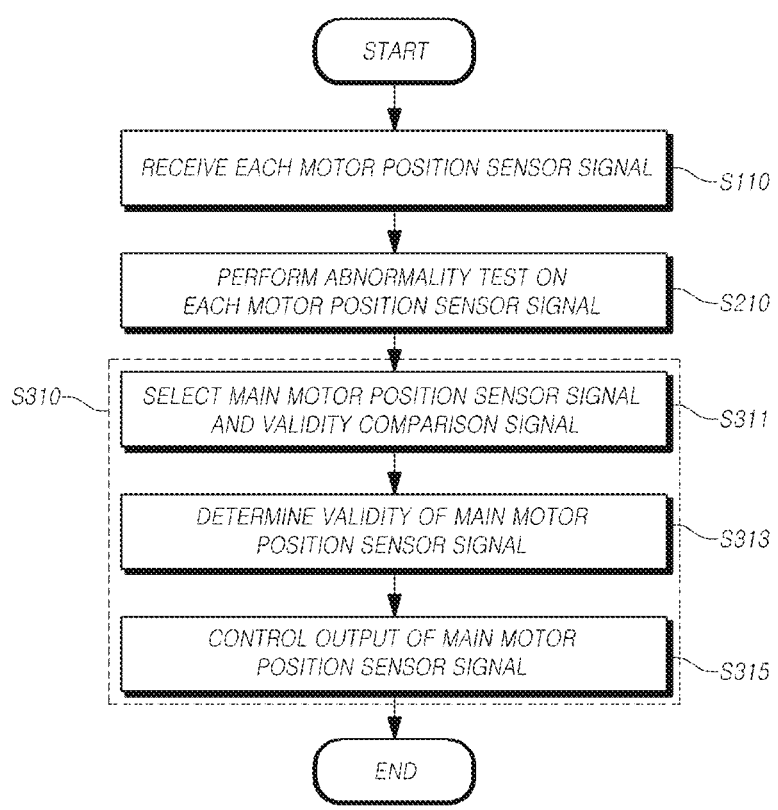
FIG. 4 is a detailed flowchart for describing a method in which motor position sensor signals output from three or more motor position sensors are processed according to the present embodiment.

FIG. 4 is a detailed flowchart for describing a method in which motor position sensor signals output from three or more motor position sensors are processed according to the present embodiment.

Referring to FIG. 4, the method in which motor position sensor signals output from three or more motor position sensors are processed according to the present embodiment may include receiving motor position sensor signals (S110), performing an abnormality test on the each motor position sensor signal (S210), and determining validity of a selected main motor position sensor signal to control an output of the selected main motor position sensor signal (S310).

In Operation S110, motor position sensor signals may be received from at least three or more motor position sensors (S110). For example, first, motor position sensor signals may be provided by at least three or more motor position sensors. Then, the motor position sensor signals may be received from the at least three or more motor position sensors by the sensor signal processing apparatus 100.

In Operation S210, the abnormality test may be performed on each of the received motor position sensor signals (S210). For example, the abnormality test may be performed on the motor position sensor signals received from Operation S110 by the sensor signal processing apparatus 100. Then, the motor position sensor signals on which the abnormality test has been performed may be provided to Operation S310, which will be described below, by the sensor signal processing apparatus 100.

In one example, by the sensor signal processing apparatus 100, the abnormality test may be performed on the motor position sensor signals received from Operation S110, and when the motor position sensor signals are normal according to the result of testing, motor position sensor signals which do not include single sensor fault information may be generated and provided to Operation S310, which will be described below.

In another example, by the sensor signal processing apparatus 100, the abnormality test may be performed on the motor position sensor signals received from Operation S110, and when the motor position sensor signals are abnormal according to the result of testing, motor position sensor signals which include single sensor fault information may be generated and provided to Operation S310, which will be described below.

In Operation S310, the motor position sensor signals on which the abnormality test has been performed may be determined as normal motor position sensor signals and abnormal motor position sensor signals, a main motor position sensor signal may be selected on the basis of the determined normal motor position sensor signals, the validity of the selected main motor position sensor signal may be determined, and an output of the selected main motor position sensor signal may be controlled (S310).

The above-described Operation S310 may include selecting a main motor position sensor signal and a validity comparison signal (S311), determining validity of the main motor position sensor signal (S313), and controlling an output of the main motor position sensor signal (S315).

In Operation S311, the motor position sensor signals on which the abnormality test has been performed may be received and determined as normal motor position sensor signals and abnormal motor position sensor signals, one of the determined normal motor position sensor signals may be selected as a main motor position sensor signal, and another one of the determined normal motor position sensor signals may be selected as a validity comparison signal (S311).

For example, first, the motor position sensor signals on which the abnormality test has been performed may be received from Operation S210 by the sensor signal processing apparatus 100. Then, the motor position sensor signals, on which the abnormality test has been performed, received from Operation S210 may be determined as normal motor position sensor signals and abnormal motor position sensor signals by the sensor signal processing apparatus 100.

In one example, by the sensor signal processing apparatus 100, the motor position sensor signals, on which the abnormality test has been performed, received from Operation S210 may be tested, and motor position sensor signals which do not include single sensor fault information according to the result of testing may be determined as the normal motor position sensor signals.

In another example, by the sensor signal processing apparatus 100, the motor position sensor signals, on which the abnormality test has been performed, received from Operation S210 may be tested, and motor position sensor signals which include single sensor fault information according to the result of testing may be determined as the abnormal motor position sensor signals.

Then, one of the motor position sensor signals, which have been determined as the normal motor position sensor signals according to the result of determining the normal motor position sensor signals and the abnormal motor position sensor signals, may be selected as the main motor position sensor signal by the sensor signal processing apparatus 100. Another one of the determined normal motor position sensor signals may be selected as the validity comparison signal by the sensor signal processing apparatus 100.

That is, by the sensor signal processing apparatus 100, the determined normal motor position sensor signals may be matched with preset pieces of motor position sensor signal priority information, and normal motor position sensor signals which match the highest priority information and the next priority information from among the pieces of motor position sensor signal priority information according to the result of matching may be selected. Then, by the sensor signal processing apparatus 100, the normal motor position sensor signal which matches the highest priority information may be selected as the main motor position sensor signal. Then, by the sensor signal processing apparatus 100, the normal motor position sensor signal which matches the next priority information may be selected as the validity comparison signal.

In Operation S313, the main motor position sensor signal and the validity comparison signal may be received, sizes of the main motor position sensor signal and the validity comparison signal may be compared, and validity of the main motor position sensor signal may be determined according to the result of comparison (S313).

For example, first, the main motor position sensor signal and the validity comparison signal may be received from Operation S311 by the sensor signal processing apparatus 100. Then, by the sensor signal processing apparatus 100, the main motor position sensor signal and the validity comparison signal received from Operation S311 may be compared, and the validity of the main motor position sensor signal may be determined according to the result of comparison.

That is, by the sensor signal processing apparatus 100, the sizes of the main motor position sensor signal and the validity comparison signal received from Operation S311 may be compared, and the validity of the main motor position sensor signal may be determined according to the result of comparison.

In one example, by the sensor signal processing apparatus 100, the sizes of the main motor position sensor signal and the validity comparison signal received from Operation S311 may be compared, and the main motor position sensor signal may be determined as valid when a difference between the sizes of the sensor signals is a preset validity value or less according to the result of comparison.

In another example, by the sensor signal processing apparatus 100, the sizes of the main motor position sensor signal and the validity comparison signal received from Operation S311 may be compared, and the main motor position sensor signal may be determined as invalid when a difference between the sizes of the sensor signals exceeds the preset validity value according to the result of comparison.

In this case, the preset validity value may be a single value, but is not limited thereto, and may also include two or more values. The preset validity value may be modified and implemented.

In Operation S315, an output of the main motor position sensor signal may be controlled according to the result of determining the validity of the main motor position sensor signal (S315). For example, by the sensor signal processing apparatus 100, the main motor position sensor signal may be received from Operation S311. Then, by the sensor signal processing apparatus 100, the result of determining the validity of the main motor position sensor signal may be received from Operation S313.

Then, by the sensor signal processing apparatus 100, an output of the main motor position sensor signal received from Operation S311 may be controlled according to the result of determining the validity of the main motor position sensor signal that is received from Operation S313.

In one example, when the main motor position sensor signal is valid according to the result of determining the validity of the main motor position sensor signal that is received from Operation S313, the main motor position sensor signal received from Operation S311 may be output by the sensor signal processing apparatus 100.

In another example, when the main motor position sensor signal is invalid according to the result of determining the validity of the main motor position sensor signal that is received from Operation S313, the main motor position sensor signal received from Operation S311 may not be output or a fault signal (e.g., LOA in a steering system) may be output by the sensor signal processing apparatus 100.

Figure 5:
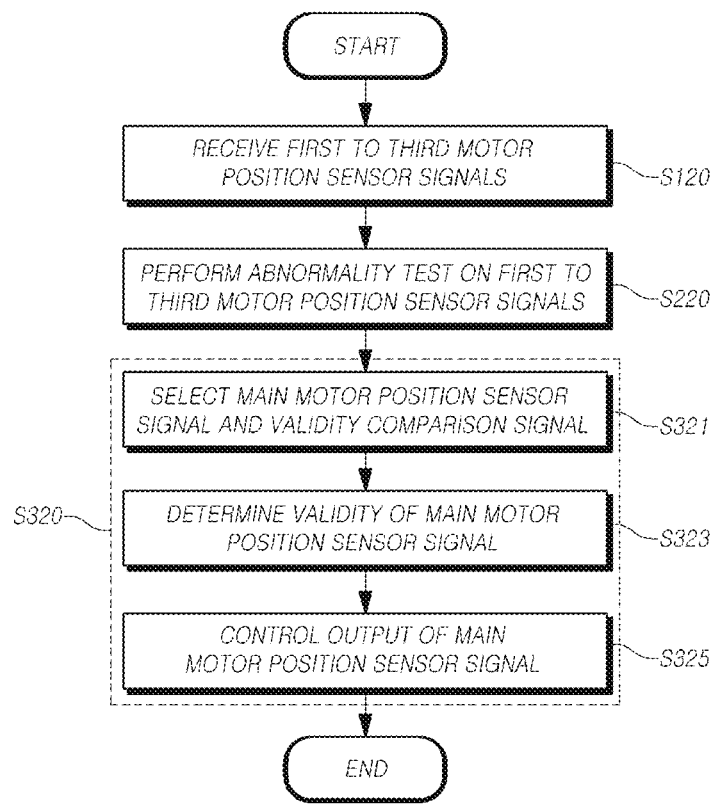
FIG. 5 is a detailed flowchart for describing a method in which motor position sensor signals output from three motor position sensors are processed according to the present embodiment.

FIG. 5 is a detailed flowchart for describing a method in which motor position sensor signals output from three motor position sensors are processed according to the present embodiment.

Referring to FIG. 5, the method in which motor position sensor signals output from three motor position sensors are processed according to the present embodiment may include receiving first to third motor position sensor signals (S120), performing an abnormality test on the first to third motor position sensor signals (S220), and determining validity of a selected main motor position sensor signal to control an output of the selected main motor position sensor signal (S320).

In Operation S120, first to third motor position sensor signals may be received from the first to third motor position sensors (S120). For example, first, first to third motor position sensor signals may be provided by the first to third motor position sensors. Then, the first to third motor position sensor signals may be received from the first to third motor position sensors by the sensor signal processing apparatus 100.

In Operation S220, the abnormality test may be performed on the received first to third motor position sensor signals (S220). For example, first, the abnormality test may be performed on the first to third motor position sensor signals received from Operation S120 by the sensor signal processing apparatus 100. Then, the first to third motor position sensor signals on which the abnormality test has been performed may be provided to Operation S320, which will be described below, by the sensor signal processing apparatus 100.

In one example, by the sensor signal processing apparatus 100, the abnormality test may be performed on the first to third motor position sensor signals received from Operation S120, and when the motor position sensor signals are normal according to the result of testing, motor position sensor signals which do not include single sensor fault information may be generated and provided to Operation S320, which will be described below.

In another example, by the sensor signal processing apparatus 100, the abnormality test may be performed on the first to third motor position sensor signals received from Operation S120, and when the motor position sensor signals are abnormal according to the result of testing, motor position sensor signals which include single sensor fault information may be generated and provided to Operation S320, which will be described below.

In Operation S320, the first to third motor position sensor signals on which the abnormality test has been performed may be determined as normal motor position sensor signals and abnormal motor position sensor signals, a main motor position sensor signal may be selected on the basis of the determined normal motor position sensor signals, the validity of the selected main motor position sensor signal may be determined, and an output of the selected main motor position sensor signal may be controlled (S320).

The above-described Operation S320 may include selecting a main motor position sensor signal and a validity comparison signal (S321), determining validity of the main motor position sensor signal (S323), and controlling an output of the main motor position sensor signal (S325).

In Operation S321, the first to third motor position sensor signals on which the abnormality test has been performed may be received and determined as normal motor position sensor signals and abnormal motor position sensor signals, one of the determined normal motor position sensor signals may be selected as a main motor position sensor signal, and another one of the determined normal motor position sensor signals may be selected as a validity comparison signal (S321).

For example, first, the first to third motor position sensor signals on which the abnormality test has been performed may be received from Operation S220 by the sensor signal processing apparatus 100. Then, the first to third motor position sensor signals, on which the abnormality test has been performed, received from Operation S220 may be determined as normal motor position sensor signals and abnormal motor position sensor signals by the sensor signal processing apparatus 100.

In one example, by the sensor signal processing apparatus 100, the first to third motor position sensor signals, on which the abnormality test has been performed, received from Operation S220 may be tested, and motor position sensor signals which do not include single sensor fault information according to the result of testing may be determined as the normal motor position sensor signals.

In another example, by the sensor signal processing apparatus 100, the first to third motor position sensor signals, on which the abnormality test has been performed, received from Operation S220 may be tested, and motor position sensor signals which include single sensor fault information according to the result of testing may be determined as the abnormal motor position sensor signals.

Then, one of the motor position sensor signals, which have been determined as the normal motor position sensor signals according to the result of determining the normal motor position sensor signals and the abnormal motor position sensor signals, may be selected as the main motor position sensor signal by the sensor signal processing apparatus 100. Another one of the determined normal motor position sensor signals may be selected as the validity comparison signal by the sensor signal processing apparatus 100.

That is, by the sensor signal processing apparatus 100, the determined normal motor position sensor signals may be matched with preset pieces of motor position sensor signal priority information, and normal motor position sensor signals which match the highest priority information and the next priority information from among the pieces of motor position sensor signal priority information according to the result of matching may be selected. Then, by the sensor signal processing apparatus 100, the normal motor position sensor signal which matches the highest priority information may be selected as the main motor position sensor signal. Then, by the sensor signal processing apparatus 100, the normal motor position sensor signal which matches the next priority information may be selected as the validity comparison signal.

In Operation S323, the main motor position sensor signal and the validity comparison signal may be received, sizes of the main motor position sensor signal and the validity comparison signal may be compared, and validity of the main motor position sensor signal may be determined according to the result of comparison (S323).

For example, first, the main motor position sensor signal and the validity comparison signal may be received from Operation S321 by the sensor signal processing apparatus 100. Then, by the sensor signal processing apparatus 100, the main motor position sensor signal and the validity comparison signal received from Operation S321 may be compared, and the validity of the main motor position sensor signal may be determined according to the result of comparison.

That is, by the sensor signal processing apparatus 100, the sizes of the main motor position sensor signal and the validity comparison signal received from Operation S321 may be compared, and the validity of the main motor position sensor signal may be determined according to the result of comparison.

In one example, by the sensor signal processing apparatus 100, the sizes of the main motor position sensor signal and the validity comparison signal received from Operation S321 may be compared, and the main motor position sensor signal may be determined as valid when a difference between the sizes of the sensor signals is a preset validity value or less according to the result of comparison.

In another example, by the sensor signal processing apparatus 100, the sizes of the main motor position sensor signal and the validity comparison signal received from Operation S321 may be compared, and the main motor position sensor signal may be determined as invalid when a difference between the sizes of the sensor signals exceeds the preset validity value according to the result of comparison.

In this case, the preset validity value may be a single value, but is not limited thereto, and may also include two or more values. The preset validity value may be modified and implemented.

In Operation S325, an output of the main motor position sensor signal may be controlled according to the result of determining the validity of the main motor position sensor signal (S325). For example, by the sensor signal processing apparatus 100, the main motor position sensor signal may be received from Operation S321. Then, by the sensor signal processing apparatus 100, the result of determining the validity of the main motor position sensor signal may be received from Operation S323.

Then, by the sensor signal processing apparatus 100, an output of the main motor position sensor signal received from Operation S321 may be controlled according to the result of determining the validity of the main motor position sensor signal that is received from Operation S323.

In one example, when the main motor position sensor signal is valid according to the result of determining the validity of the main motor position sensor signal that is received from Operation S323, the main motor position sensor signal received from Operation S321 may be output by the sensor signal processing apparatus 100.

In another example, when the main motor position sensor signal is invalid according to the result of determining the validity of the main motor position sensor signal that is received from Operation S323, the main motor position sensor signal received from Operation S321 may not be output or a fault signal (e.g., LOA in a steering system) may be output by the sensor signal processing apparatus 100.

Figure 6:
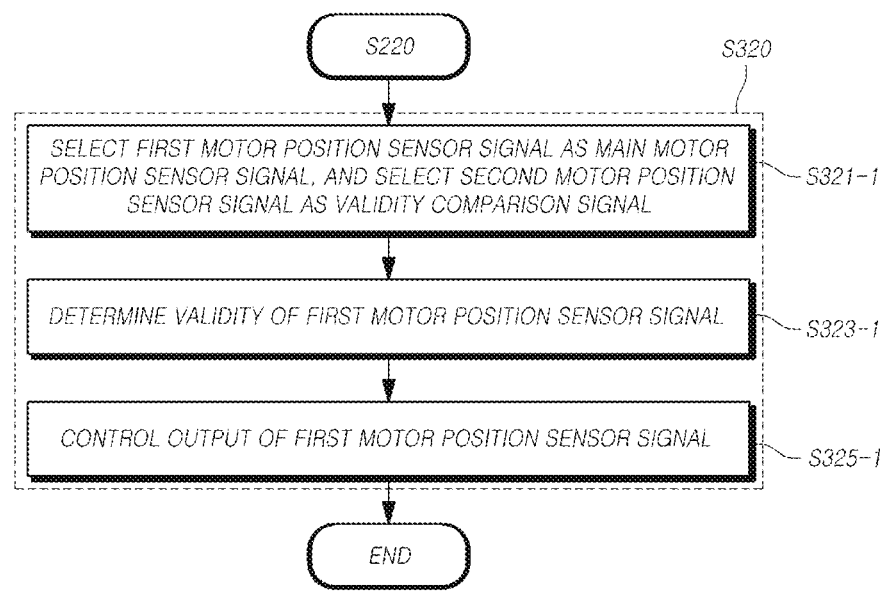
FIGS. 6 to 8 are detailed flowcharts for describing a method in which validity of a main motor position sensor signal selected from the motor position sensor signals of FIG. 5 is determined and an output of the selected main motor position sensor signal is controlled.
Figure 7:
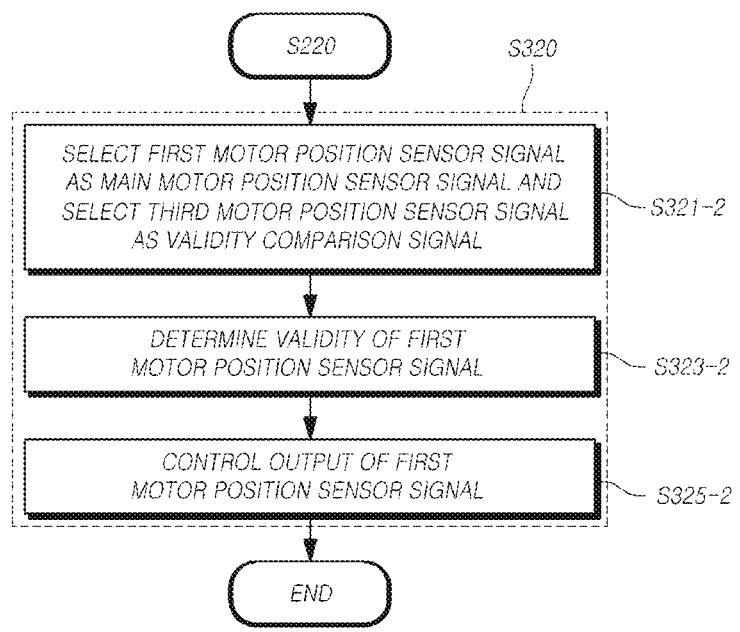
Figure 8:
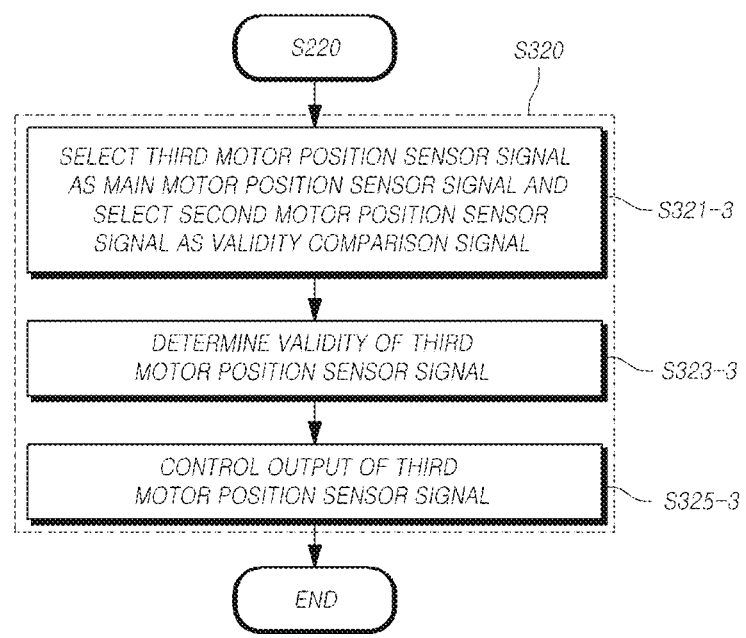

FIGS. 6 to 8 are detailed flowcharts for describing a method in which validity of a main motor position sensor signal selected from the motor position sensor signals of FIG. 5 is determined and an output of the selected main motor position sensor signal is controlled.

Referring to FIGS. 5 to 8, in the receiving of the first to third motor position sensor signals (S120), from among the first to third motor position sensor signals, the first and second motor position sensor signals may be provided from the first and second motor position sensors disposed in a dual die, and the third motor position sensor signal may be provided from the third motor position sensor disposed in a single die.

From among the first to third motor position sensor signals, the second and third motor position sensor signals may be values sampled in the same cycle, and the first motor position sensor signal may be a value sampled in a shorter cycle than the second and third motor position sensor signals.

Referring to FIGS. 5 and 6, in Operation S321-1, when the first and second motor position sensor signals are normal motor position sensor signals according to the result of receiving the first to third motor position sensor signals, on which the abnormality test has been performed, and determining the first to third motor position sensor signals as normal motor position sensor signals and abnormal motor position sensor signals, the first motor position sensor signal may be selected as the main motor position sensor signal, and the second motor position sensor signal may be selected as the validity comparison signal (S321-1).

For example, first, by the sensor signal processing apparatus 100, the first to third motor position sensor signals on which the abnormality test has been performed may be received from Operation S220. Then, by the sensor signal processing apparatus 100, the first to third motor position sensor signals, on which the abnormality test has been performed, received from Operation S220 may be determined as normal motor position sensor signals and abnormal motor position sensor signals.

Then, when the first and second motor position sensor signals are normal motor position sensor signals according to the result of determining, the first motor position sensor signal may be selected as the main motor position sensor signal, and the second motor position sensor signal may be selected as the validity comparison signal by the sensor signal processing apparatus 100.

In Operation S323-1, the first and second motor position sensor signals may be received, sizes of the first and second motor position sensor signals may be compared, and the validity of the first motor position sensor signal may be determined according to the result of comparison (S323-1).

In one example, by the sensor signal processing apparatus 100, sizes of the first and second motor position sensor signals received from Operation S321-1 may be compared, and the first motor position sensor signal may be determined as valid when a difference between the sizes of the first and second motor position sensor signals is a preset validity value or less according to the result of comparison.

In another example, by the sensor signal processing apparatus 100, sizes of the first and second motor position sensor signals received from Operation S321-1 may be compared, and the first motor position sensor signal may be determined as invalid when a difference between the sizes of the first and second motor position sensor signals exceeds the preset validity value according to the result of comparison.

In this case, the preset validity value may be a single value, but is not limited thereto, and may also include two or more values. The preset validity value may be modified and implemented.

In Operation S325-1, an output of the first motor position sensor signal may be controlled according to the result of determining the validity of the first motor position sensor signal (S325-1).

In one example, when the first motor position sensor signal is valid according to the result of determining the validity of the first motor position sensor signal in Operation S323-1, the first motor position sensor signal selected in Operation S321-1 may be output by the sensor signal processing apparatus 100.

In another example, when the first motor position sensor signal is invalid according to the result of determining the validity of the first motor position sensor signal in Operation S323-1, the first motor position sensor signal selected in Operation S321-1 may not be output or a fault signal (e.g., LOA in a steering system) may be output by the sensor signal processing apparatus 100.

Referring to FIGS. 5 and 7, in Operation S321-2, when the first and third motor position sensor signals are normal motor position sensor signals according to the result of receiving the first to third motor position sensor signals, on which the abnormality test has been performed, and determining the first to third motor position sensor signals as normal motor position sensor signals and abnormal motor position sensor signals, the first motor position sensor signal may be selected as the main motor position sensor signal, and the third motor position sensor signal may be selected as the validity comparison signal (S321-2).

For example, first, by the sensor signal processing apparatus 100, the first to third motor position sensor signals on which the abnormality test has been performed may be received from Operation S220. Then, by the sensor signal processing apparatus 100, the first to third motor position sensor signals, on which the abnormality test has been performed, received from Operation S220 may be determined as normal motor position sensor signals and abnormal motor position sensor signals.

Then, when the first and third motor position sensor signals are normal motor position sensor signals according to the result of determining, the first motor position sensor signal may be selected as the main motor position sensor signal, and the third motor position sensor signal may be selected as the validity comparison signal by the sensor signal processing apparatus 100.

In Operation S323-2, the first and third motor position sensor signals may be received, sizes of the first and third motor position sensor signals may be compared, and the validity of the first motor position sensor signal may be determined according to the result of comparison (S323-2).

In one example, by the sensor signal processing apparatus 100, sizes of the first and third motor position sensor signals received from Operation S321-2 may be compared, and the first motor position sensor signal may be determined as valid when a difference between the sizes of the first and third motor position sensor signals is a preset validity value or less according to the result of comparison.

In another example, by the sensor signal processing apparatus 100, sizes of the first and third motor position sensor signals received from Operation S321-2 may be compared, and the first motor position sensor signal may be determined as invalid when a difference between the sizes of the first and third motor position sensor signals exceeds the preset validity value according to the result of comparison.

In this case, the preset validity value may be a single value, but is not limited thereto, and may also include two or more values. The preset validity value may be modified and implemented.

In Operation S325-2, an output of the first motor position sensor signal may be controlled according to the result of determining the validity of the first motor position sensor signal (S325-2).

In one example, when the first motor position sensor signal is valid according to the result of determining the validity of the first motor position sensor signal in Operation S323-2, the first motor position sensor signal selected in Operation S321-2 may be output by the sensor signal processing apparatus 100.

In another example, when the first motor position sensor signal is invalid according to the result of determining the validity of the first motor position sensor signal in Operation S323-2, the first motor position sensor signal selected in Operation S321-2 may not be output or a fault signal (e.g., LOA in a steering system) may be output by the sensor signal processing apparatus 100.

Referring to FIGS. 5 and 8, in Operation S321-3, when the second and third motor position sensor signals are normal motor position sensor signals according to the result of receiving the first to third motor position sensor signals, on which the abnormality test has been performed, and determining the first to third motor position sensor signals as normal motor position sensor signals and abnormal motor position sensor signals, the third motor position sensor signal may be selected as the main motor position sensor signal, and the second motor position sensor signal may be selected as the validity comparison signal (S321-3).

For example, first, by the sensor signal processing apparatus 100, the first to third motor position sensor signals on which the abnormality test has been performed may be received from Operation S220. Then, by the sensor signal processing apparatus 100, the first to third motor position sensor signals, on which the abnormality test has been performed, received from Operation S220 may be determined as normal motor position sensor signals and abnormal motor position sensor signals.

Then, when the second and third motor position sensor signals are normal motor position sensor signals according to the result of determining, the third motor position sensor signal may be selected as the main motor position sensor signal, and the second motor position sensor signal may be selected as the validity comparison signal by the sensor signal processing apparatus 100.

In Operation S323-3, the second and third motor position sensor signals may be received, sizes of the second and third motor position sensor signals may be compared, and the validity of the third motor position sensor signal may be determined according to the result of comparison (S323-3).

In one example, by the sensor signal processing apparatus 100, sizes of the second and third motor position sensor signals received from Operation S321-3 may be compared, and the third motor position sensor signal may be determined as valid when a difference between the sizes of the second and third motor position sensor signals is a preset validity value or less according to the result of comparison.

In another example, by the sensor signal processing apparatus 100, sizes of the second and third motor position sensor signals received from Operation S321-3 may be compared, and the third motor position sensor signal may be determined as invalid when a difference between the sizes of the second and third motor position sensor signals exceeds the preset validity value according to the result of comparison.

In this case, the preset validity value may be a single value, but is not limited thereto, and may also include two or more values. The preset validity value may be modified and implemented.

In Operation S325-3, an output of the third motor position sensor signal may be controlled according to the result of determining the validity of the third motor position sensor signal (S325-3).

In one example, when the third motor position sensor signal is valid according to the result of determining the validity of the third motor position sensor signal in Operation S323-3, the third motor position sensor signal selected in Operation S321-3 may be output by the sensor signal processing apparatus 100.

In another example, when the third motor position sensor signal is invalid according to the result of determining the validity of the third motor position sensor signal in Operation S323-3, the third motor position sensor signal selected in Operation S321-3 may not be output or a fault signal (e.g., LOA in a steering system) may be output by the sensor signal processing apparatus 100.

Hereinafter, a steering control apparatus according to the present embodiment will be described with reference to the accompanying drawings. Particularly, for the simplicity of description, description of parts which overlap those of the sensor signal processing apparatus and sensor signal processing method according to the present embodiment which have been described above with reference to FIGS. 1 to 8 will be omitted below.

Figure 9:
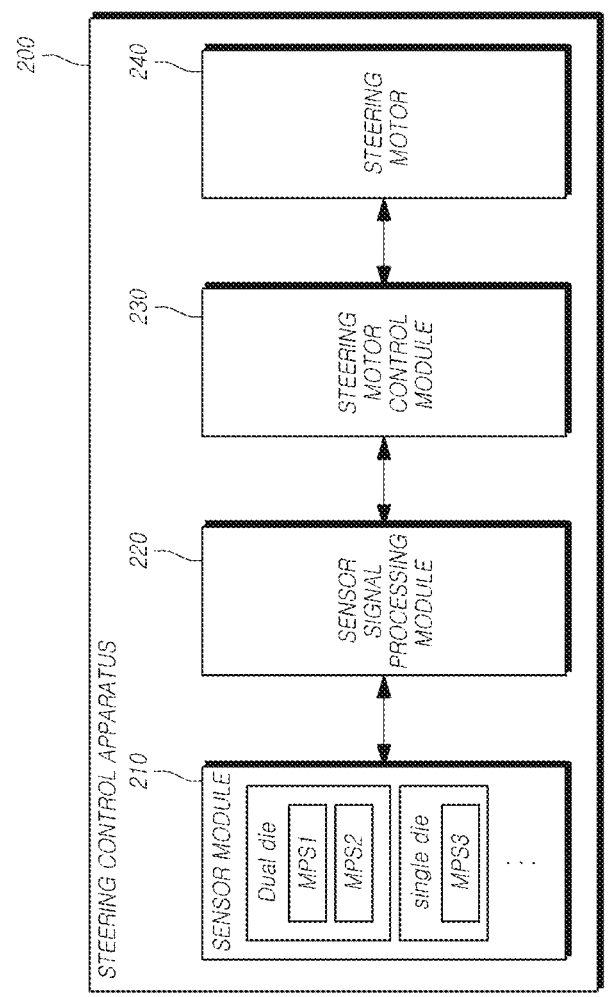
FIG. 9 is an overall block diagram for describing a steering control apparatus according to the present embodiment.

FIG. 9 is an overall block diagram for describing a steering control apparatus according to the present embodiment.

Referring to FIG. 9, the steering control apparatus according to the present embodiment may include a sensor module 210, a sensor signal processing module 220, a steering motor control module 230, and a steering motor 240.

The sensor module 210 may include at least three or more sensors. In this case, the sensors may include motor positions sensors MPS1 to MPS3 as illustrated in FIG. 9, but the sensors are not limited thereto, and may include at least one of a position sensor, a speed sensor (e.g., a vehicle speed sensor), a torque sensor, an angle sensor (e.g., a steering angle sensor), an illuminance sensor, a rain sensor, a snow sensor, a camera sensor, a radar sensor, a lidar sensor, a pressure sensor, a Hall sensor, and a flow rate sensor. However, the sensors are not limited thereto and may include any sensor capable of sensing a physical amount or a change therein.

The sensor module 210 may measure a position of the steering motor 240 through at least three or more motor position sensors MPS1 to MPS3. The sensor module 210 may generate motor position sensor signals on the basis of the position of the steering motor 240 measured through the at least three or more motor position sensors MPS1 to MPS3. The sensor module 210 may provide the generated motor position sensor signals to the sensor signal processing module 220, which will be described below.

The sensor signal processing module 220 may receive the motor position sensor signals from the sensor module 210, determine the received motor position sensor signals as normal motor position sensor signals and abnormal motor position sensor signals, select a main motor position sensor signal on the basis of the determined normal motor position sensor signals, determine validity of the selected main motor position sensor signal, and control an output of the selected main motor position sensor signal.

Specifically, the sensor signal processing module 220 may be connected to the sensor module 210. The sensor signal processing module 220 may receive motor position sensor signals from the sensor module 210. The sensor signal processing module 220 may perform an abnormality test on the motor position sensor signals received from the sensor module 210 and determine the motor position sensor signals as normal motor position sensor signals and abnormal motor position sensor signals.

The sensor signal processing module 220 may select the main motor position sensor signal on the basis of the determined normal motor position sensor signals. The sensor signal processing module 220 may determine validity of the selected main motor position sensor signals on the basis of the determined normal motor position sensor signals.

The sensor signal processing module 220 may control an output of the selected main motor position sensor signal according to the result of determining the validity of the selected main motor position sensor signal.

In this case, since the sensor signal processing module 220 may be understood as including the same elements as the sensor signal processing apparatus 100 which has been described above with reference to FIG. 1, description of overlapping parts will be omitted below for the simplicity of description.

The steering motor control module 230 may be connected to the sensor signal processing module 220. The steering motor control module 230 may receive the output-controlled main motor position sensor signal from the sensor signal processing module 220.

The steering motor control module 230 may generate an steering assist force on the basis of the output-controlled main motor position sensor signal that is received from the sensor signal processing module 220. The steering motor control module 230 may control an operation of the steering motor 240 using the generated steering assist force.

The steering motor 240 may be connected to the steering motor control module 230. The steering motor 240 may receive the generated steering assist force from the steering motor control module 230. The operation of the steering motor 240 may be controlled by the steering assist force received from the steering motor control module 230.

Referring to FIG. 9, the sensor module 210 may include first to third motor position sensors MPS1 to MPS3. The sensor module 210 may measure the position of the steering motor 240 through the first to third motor position sensors MPS1 to MPS3. First to third motor position sensor signals may be generated on the basis of the position of the steering motor 240 measured through the first to third motor position sensors MPS1 to MPS3. The sensor module 210 may provide the generated first to third motor position sensor signals to the sensor signal processing module 220.

The sensor signal processing module 220 may receive the first to third motor position sensor signals from the sensor module 210, determine the received first to third motor position sensor signals as normal motor position sensor signals and abnormal motor position sensor signals, select a main motor position sensor signal on the basis of the determined normal motor position sensor signals, determine validity of the selected main motor position sensor signal, and control an output of the selected main motor position sensor signal.

Specifically, the sensor signal processing module 220 may be connected to the sensor module 210. The sensor signal processing module 220 may receive the first to third motor position sensor signals from the sensor module 210. The sensor signal processing module 220 may perform an abnormality test on the first to third motor position sensor signals received from the sensor module 210 and determine the first to third motor position sensor signals as normal motor position sensor signals and abnormal motor position sensor signals.

The sensor signal processing module 220 may select a main motor position sensor signal on the basis of the determined normal motor position sensor signals. The sensor signal processing module 220 may determine the validity of the selected main motor position sensor signal on the basis of the determined normal motor position sensor signals.

The sensor signal processing module 220 may control an output of the selected main motor position sensor signal according to the result of determining the validity of the selected main motor position sensor signal.

The steering motor control module 230 may be connected to the sensor signal processing module 220. The steering motor control module 230 may receive the output-controlled main motor position sensor signal from the sensor signal processing module 220.

The steering motor control module 230 may generate an steering assist force on the basis of the output-controlled main motor position sensor signal that is received from the sensor signal processing module 220. The steering motor control module 230 may control an operation of the steering motor 240 using the generated steering assist force.

The steering motor 240 may be connected to the steering motor control module 230. The steering motor 240 may receive the generated steering assist force from the steering motor control module 230. The operation of the steering motor 240 may be controlled by the steering assist force received from the steering motor control module 230.

In this case, the steering motor 240 may include a motor for steering of a vehicle, but is not limited thereto, and may include any motor as long as the motor is driven using a sensor signal.

Referring to FIG. 9, the sensor module 210 may include first to third motor position sensors MPS1 to MPS3. In this case, the first and second motor position sensors MPS1 and MPS2 of the sensor module 210 may be disposed in a dual die. The third motor position sensor MPS3 of the sensor module 210 may be disposed in a single die.

The sensor module 210 may measure the position of the steering motor 240 through the second and third motor position sensors MPS2 and MPS3 in the same sampling cycle and generate the second and third motor position sensor signals on the basis of the measurement. The sensor module 210 may measure the position of the steering motor 240 through the first motor position sensor MPS1 in a shorter sampling cycle than the sampling cycle of the second and third motor position sensors MPS2 and MPS3 and generate the first motor position sensor signal on the basis of the measurement. The sensor module 210 may provide the generated first to third motor position sensor signals to the sensor signal processing module 220.

A sensor signal processing method according to the result of determining the first to third motor position sensor signals as normal or abnormal by the sensor signal processing module 220 will be described below.

According to the present embodiment, the sensor signal processing module 220 may receive the first to third motor position sensor signals from the sensor module 210, determine the received first to third motor position sensor signals as normal motor position sensor signals and abnormal motor position sensor signals, when the first and second motor position sensor signals are normal motor position sensor signals according to the result of determining, select the first motor position sensor signal as a main motor position sensor signal and select the second motor position sensor signal as the validity comparison signal, compare sizes of the first and second motor position sensor signals, determine the validity of the first motor position sensor signal, and control an output of the first motor position sensor signal according to the result of determining the validity of the first motor position sensor signal.

Specifically, the sensor signal processing module 220 may be connected to the sensor module 210. The sensor signal processing module 220 may receive the first to third motor position sensor signals from the sensor module 210.

The sensor signal processing module 220 may perform an abnormality test on the first to third motor position sensor signals received from the sensor module 210. The sensor signal processing module 220 may determine the first to third motor position sensor signals, on which the abnormality test has been performed, as normal motor position sensor signals and abnormal motor position sensor signals. In one example, the sensor signal processing module 220 may test the first to third motor position sensor signals on which the abnormality test has been performed and determine motor position sensor signals which do not include single sensor fault information according to the result of testing as the normal motor position sensor signals.

In another example, the sensor signal processing module 220 may test the first to third motor position sensor signals on which the abnormality test has been performed and determine motor position sensor signals which include single sensor fault information according to the result of testing as the abnormal motor position sensor signals.

When the first and second motor position sensor signals are normal motor position sensor signals according to the result of determining the first to third motor position sensor signals, on which the abnormality test has been performed, as normal or abnormal, the sensor signal processing module 220 may select the first motor position sensor signal as the main motor position sensor signal and select the second motor position sensor signal as the validity comparison signal.

The sensor signal processing module 220 may compare the first and second motor position sensor signals and determine the validity of the first motor position sensor signal according to the result of comparison.

That is, the sensor signal processing module 220 may compare sizes of the first and second motor position sensor signals and determine the validity of the first motor position sensor signal according to the result of comparison.

In one example, the sensor signal processing module 220 may compare sizes of the first and second motor position sensor signals and determine that the first motor position sensor signal is valid when a difference between the sizes of the first and second motor position sensor signals is a preset validity value or less according to the result of comparison.

In another example, the sensor signal processing module 220 may compare sizes of the first and second motor position sensor signals and determine that the first motor position sensor signal is invalid when a difference between the sizes of the first and second motor position sensor signals exceeds the preset validity value according to the result of comparison.

In this case, the preset validity value may be a single value, but is not limited thereto, and may also include two or more values. The preset validity value may be modified and implemented.

The sensor signal processing module 220 may control an output of the selected first motor position sensor signal according to the result of determining the validity of the first motor position sensor signal. In one example, the sensor signal processing module 220 may output the first motor position sensor signal when the first motor position sensor signal is valid according to the result of determining the validity of the first motor position sensor signal.

In another example, the sensor signal processing module 220 may not output the first motor position sensor signal or may output a fault signal (e.g., LOA in a steering system) when the first motor position sensor signal is invalid according to the result of determining the validity of the first motor position sensor signal.

The steering motor control module 230 may be connected to the sensor signal processing module 220. The steering motor control module 230 may receive the validity-checked first motor position sensor signal or an LOA signal from the sensor signal processing module 220.

The steering motor control module 230 may generate an steering assist force on the basis of the validity-checked first motor position sensor signal that is received from the sensor signal processing module 220. The steering motor control module 230 may control the operation of the steering motor 240 using the generated steering assist force.

The steering motor control module 230 may stop the operation of the steering motor 240 on the basis of the LOA signal received from the sensor signal processing module 220.

According to the present embodiment, the sensor signal processing module 220 may receive the first to third motor position sensor signals from the sensor module 210, determine the received first to third motor position sensor signals as normal motor position sensor signals and abnormal motor position sensor signals, when the first and third motor position sensor signals are normal motor position sensor signals according to the result of determining, select the first motor position sensor signal as a main motor position sensor signal and select the third motor position sensor signal as the validity comparison signal, compare sizes of the first and third motor position sensor signals, determine the validity of the first motor position sensor signal, and control an output of the first motor position sensor signal according to the result of determining the validity of the first motor position sensor signal.

Specifically, the sensor signal processing module 220 may be connected to the sensor module 210. The sensor signal processing module 220 may receive the first to third motor position sensor signals from the sensor module 210.

The sensor signal processing module 220 may perform an abnormality test on the first to third motor position sensor signals received from the sensor module 210. The sensor signal processing module 220 may determine the first to third motor position sensor signals, on which the abnormality test has been performed, as normal motor position sensor signals and abnormal motor position sensor signals. In one example, the sensor signal processing module 220 may test the first to third motor position sensor signals on which the abnormality test has been performed and determine motor position sensor signals which do not include single sensor fault information according to the result of testing as the normal motor position sensor signals.

In another example, the sensor signal processing module 220 may test the first to third motor position sensor signals on which the abnormality test has been performed and determine motor position sensor signals which include single sensor fault information according to the result of testing as the abnormal motor position sensor signals.

When the first and third motor position sensor signals are normal motor position sensor signals according to the result of determining the first to third motor position sensor signals, on which the abnormality test has been performed, as normal or abnormal, the sensor signal processing module 220 may select the first motor position sensor signal as the main motor position sensor signal and select the third motor position sensor signal as the validity comparison signal.

The sensor signal processing module 220 may compare the first and third motor position sensor signals and determine the validity of the first motor position sensor signal according to the result of comparison.

That is, the sensor signal processing module 220 may compare sizes of the first and third motor position sensor signals and determine the validity of the first motor position sensor signal according to the result of comparison.

In one example, the sensor signal processing module 220 may compare sizes of the first and third motor position sensor signals and determine that the first motor position sensor signal is valid when a difference between the sizes of the first and third motor position sensor signals is a preset validity value or less according to the result of comparison.

In another example, the sensor signal processing module 220 may compare sizes of the first and third motor position sensor signals and determine that the first motor position sensor signal is invalid when a difference between the sizes of the first and third motor position sensor signals exceeds the preset validity value according to the result of comparison.

In this case, the preset validity value may be a single value, but is not limited thereto, and may also include two or more values. The preset validity value may be modified and implemented.

The sensor signal processing module 220 may control an output of the selected first motor position sensor signal according to the result of determining the validity of the first motor position sensor signal. In one example, the sensor signal processing module 220 may output the first motor position sensor signal when the first motor position sensor signal is valid according to the result of determining the validity of the first motor position sensor signal.

In another example, the sensor signal processing module 220 may not output the first motor position sensor signal or may output a fault signal (e.g., LOA in a steering system) when the first motor position sensor signal is invalid according to the result of determining the validity of the first motor position sensor signal.

The steering motor control module 230 may be connected to the sensor signal processing module 220. The steering motor control module 230 may receive the validity-checked first motor position sensor signal or an LOA signal from the sensor signal processing module 220.

The steering motor control module 230 may generate an steering assist force on the basis of the validity-checked first motor position sensor signal that is received from the sensor signal processing module 220. The steering motor control module 230 may control the operation of the steering motor 240 using the generated steering assist force.

The steering motor control module 230 may stop the operation of the steering motor 240 on the basis of the LOA signal received from the sensor signal processing module 220.

According to the present embodiment, the sensor signal processing module 220 may receive the first to third motor position sensor signals from the sensor module 210, determine the received first to third motor position sensor signals as normal motor position sensor signals and abnormal motor position sensor signals, when the second and third motor position sensor signals are normal motor position sensor signals according to the result of determining, select the third motor position sensor signal as a main motor position sensor signal and select the second motor position sensor signal as the validity comparison signal, compare sizes of the second and third motor position sensor signals, determine the validity of the third motor position sensor signal, and control an output of the third motor position sensor signal according to the result of determining the validity of the third motor position sensor signal.

Specifically, the sensor signal processing module 220 may be connected to the sensor module 210. The sensor signal processing module 220 may receive the first to third motor position sensor signals from the sensor module 210.

The sensor signal processing module 220 may perform an abnormality test on the first to third motor position sensor signals received from the sensor module 210. The sensor signal processing module 220 may determine the first to third motor position sensor signals, on which the abnormality test has been performed, as normal motor position sensor signals and abnormal motor position sensor signals. In one example, the sensor signal processing module 220 may test the first to third motor position sensor signals on which the abnormality test has been performed and determine motor position sensor signals which do not include single sensor fault information according to the result of testing as the normal motor position sensor signals.

In another example, the sensor signal processing module 220 may test the first to third motor position sensor signals on which the abnormality test has been performed and determine motor position sensor signals which include single sensor fault information according to the result of testing as the abnormal motor position sensor signals.

When the second and third motor position sensor signals are normal motor position sensor signals according to the result of determining the first to third motor position sensor signals, on which the abnormality test has been performed, as normal or abnormal, the sensor signal processing module 220 may select the third motor position sensor signal as the main motor position sensor signal and select the second motor position sensor signal as the validity comparison signal.

The sensor signal processing module 220 may compare the second and third motor position sensor signals and determine the validity of the third motor position sensor signal according to the result of comparison.

That is, the sensor signal processing module 220 may compare sizes of the second and third motor position sensor signals and determine the validity of the third motor position sensor signal according to the result of comparison.

In one example, the sensor signal processing module 220 may compare sizes of the second and third motor position sensor signals and determine that the third motor position sensor signal is valid when a difference between the sizes of the second and third motor position sensor signals is a preset validity value or less according to the result of comparison.

In another example, the sensor signal processing module 220 may compare sizes of the second and third motor position sensor signals and determine that the third motor position sensor signal is invalid when a difference between the sizes of the second and third motor position sensor signals exceeds the preset validity value according to the result of comparison.

In this case, the preset validity value may be a single value, but is not limited thereto, and may also include two or more values. The preset validity value may be modified and implemented.

The sensor signal processing module 220 may control an output of the selected third motor position sensor signal according to the result of determining the validity of the third motor position sensor signal. In one example, the sensor signal processing module 220 may output the third motor position sensor signal when the third motor position sensor signal is valid according to the result of determining the validity of the third motor position sensor signal.

In another example, the sensor signal processing module 220 may not output the third motor position sensor signal or may output a fault signal (e.g., LOA in a steering system) when the third motor position sensor signal is invalid according to the result of determining the validity of the third motor position sensor signal.

The steering motor control module 230 may be connected to the sensor signal processing module 220. The steering motor control module 230 may receive the validity-checked third motor position sensor signal or an LOA signal from the sensor signal processing module 220.

The steering motor control module 230 may generate an steering assist force on the basis of the validity-checked third motor position sensor signal that is received from the sensor signal processing module 220. The steering motor control module 230 may control the operation of the steering motor 240 using the generated steering assist force.

The steering motor control module 230 may stop the operation of the steering motor 240 on the basis of the LOA signal received from the sensor signal processing module 220.

As described above, in the steering control apparatus according to the present embodiment, three or more sensor signals (e.g., motor position sensor signals) are measured by the sensor module, an abnormality test is performed on the three or more sensor signals, a main sensor signal (e.g., a main normal motor position sensor signal) is selected on the basis of the abnormality test, the validity of the selected main sensor signal is determined, and an output of the selected main sensor signal is controlled by the sensor signal processing module, and an operation of the steering motor is controlled by the steering motor control module using the output-controlled main sensor signal. In this way, in comparison to when sensor signals are output using two sensor signals to control the steering motor, sensor signals can be output using three or more sensor signals to control the steering motor such that, while a demand for redundancy regarding the steering control can be satisfied, a demand for reliability regarding the steering control can be satisfied due to the steering motor being controlled by outputting the main sensor signal after the abnormality test is performed on the sensor signals and validity of the main sensor signal is determined.

Figure 10:
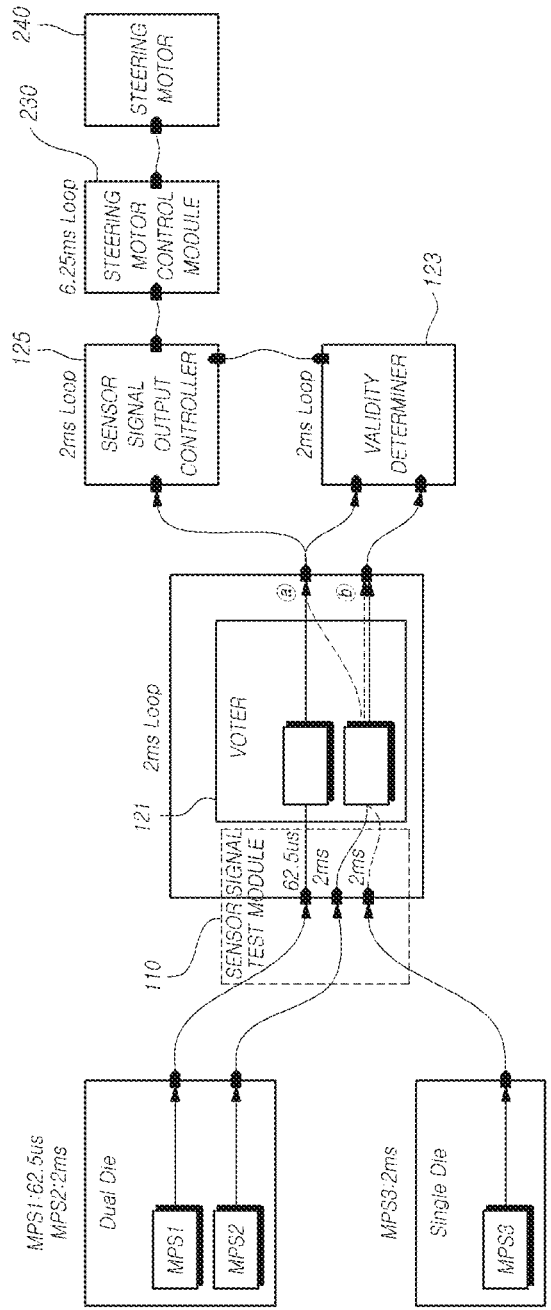
FIG. 10 is a conceptual diagram for describing the concept of the steering control apparatus according to the present embodiment.

FIG. 10 is a conceptual diagram for describing the concept of the steering control apparatus according to the present embodiment.

Referring to FIG. 10, as illustrated in FIG. 10, first and second motor position sensors MPS1 and MPS2 may be disposed in a dual die. A third motor position sensor MPS3 may be disposed in a single die.

Particularly, the first motor position sensor MPS1 disposed in the dual die may be controlled to have a 62.5 µs-sampling cycle. The second motor position sensor MPS2 disposed in the dual die may be controlled to have a 2 ms-sampling cycle. The third motor position sensor MPS3 disposed in the single die may be controlled to have the 2 ms-sampling cycle.

The sensor signal test module 110, the voter 121, the validity determiner 123, and the sensor signal output controller 125 may be controlled to the 2 ms-sampling cycle. The steering motor control module 230 may be controlled to have the 62.5 µs-sampling cycle.

From among the first to third motor position sensor signals, the first motor position sensor signal may be a main motor position sensor signal for controlling the operation of the steering motor 240. The second motor position sensor signal may be a validity comparison signal for controlling the operation of the steering motor 240. The third motor position sensor signal may be a motor position sensor signal for fully assisting the steering motor 240 when a single sensor fault has occurred in the first motor position sensor signal or the second motor position sensor signal.

That is, when the first and second motor position sensor signals are determined as normal motor position sensor signals by the sensor signal test module 110, the steering motor 240 may be driven using the first motor position sensor signal, and the validity of the first motor position sensor signal may be determined using the second motor position sensor signal.

In one example, when even the third motor position sensor signal is determined as a normal motor position sensor signal, the third motor position sensor signal may also be selected as a validity comparison signal. Then, the sizes of the first and second motor position sensor signals may be compared for validity determination. The sizes of the first and third motor position sensor signals may be compared for validity determination. The sizes of the second and third motor position sensor signals may be compared for validity determination.

When all of the differences between the compared sizes of the first to third motor position sensor signals are a preset validity value or less, the first motor position sensor signal, which is the main motor position sensor signal, may be determined as valid. That is, by using the single die, which is separate from the dual die, in motor control or validity determination, redundancy regarding the motor position sensors may be secured.

When it is found by the sensor signal test module 110 that a single sensor fault has occurred in the first or second motor position sensor signal, the third motor position sensor signal may be used to fully assist the steering motor 240.

In one example, when it is found by the sensor signal test module 110 that a single sensor fault has occurred in the second motor position sensor signal, the steering motor 240 may be driven using the first motor position sensor signal, and as illustrated in FIG. 10, i.e., b of FIG. 10, the validity of the first motor position sensor signal may be determined using the third motor position sensor signal.

In another example, when it is found by the sensor signal test module 110 that a single sensor fault has occurred in the first motor position sensor signal, as illustrated in FIG. 10, i.e., a of FIG. 10, the steering motor 240 may be driven using the third motor position sensor signal, and the validity of the third motor position sensor signal may be determined using the second motor position sensor signal.

In one example, since the dual die and the single die are disposed at positions spaced apart from each other, each of the first to third motor position sensor signals may exhibit a phase difference according to a position thereof. Accordingly, in the validity determiner 123, the sizes of the first to third motor position sensor signals may be compared in consideration of the phase difference according to the arrangement of the dual die and the single die. Alternatively, in one example, a phase difference according to the arrangement of the dual die and the single die may be reflected to the first to third motor position sensor signals, and then the first to third motor position sensor signals may be provided to the voter 121.

The above-described steering control apparatus according to the present embodiment may include an ECU or EPS, but is not limited thereto, and may include any device capable of controlling steering.

Figure 11:
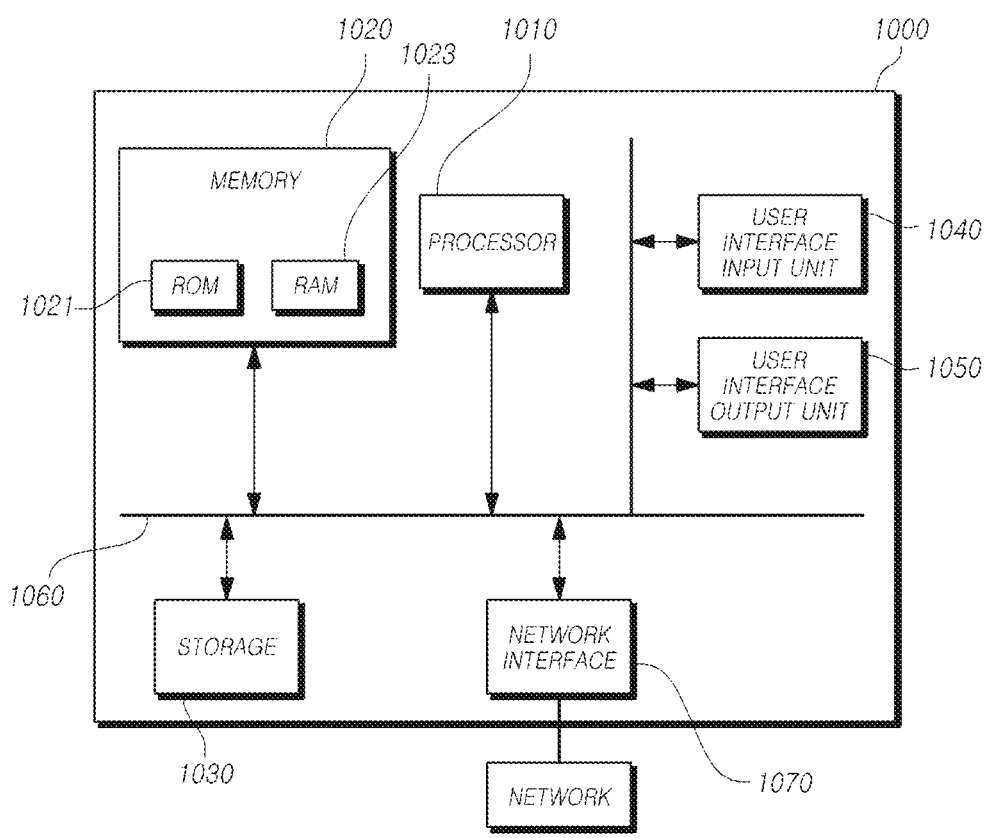
FIG. 11 is a block diagram of configurations of the sensor signal processing apparatus and the steering control apparatus according to the present embodiment.

FIG. 11 is a block diagram of configurations of the sensor signal processing apparatus and the steering control apparatus according to the present embodiment.

Referring to FIG. 11, the above-described present embodiment may be realized as, for example, a computer readable recording medium in a computer system. As illustrated in FIG. 11, a computer system 1000 of the sensor signal processing apparatus 100, the steering control apparatus 200, and the like may include at least one of one or more processors 1010, a memory 1020, a storage 1030, a user interface input unit 1040, and a user interface output unit 1050, and these elements may communicate with each other via a bus 1060. The computer system 1000 may further include a network interface 1070 for connecting to a network. The processor 1010 may be a central processing unit (CPU) or semiconductor device configured to execute a processing instruction stored in the memory 1020 and/or the storage 1030. The memory 1020 and the storage 1030 may include various types of volatile/nonvolatile storage media. For example, the memory may include a read-only memory (ROM) 1021 and a random access memory (RAM) 1023.

Accordingly, the embodiments of the present disclosure may be realized using a method realized by a computer or a nonvolatile computer recording medium in which computer-executable instructions are stored. The instructions may perform the method according to at least one embodiment of the present disclosure when the instructions are executed by the processor.

Embodiments of the apparatus and method for processing sensor signals and a steering control apparatus according to the present embodiment have been described above, but the present embodiment is not limited thereto. Various modifications may be made within the scope of the claims, detailed description of the disclosure, and the accompanying drawings, and such modifications also belong to the present embodiment.

What is claimed is:

1. An apparatus for processing a sensor signal, the apparatus comprising:
   a sensor signal test module configured to receive a sensor signal from each of at least three or more sensors and perform an abnormality test on the received sensor signals; and
   a sensor signal selection module configured to:
   receive the sensor signals on which the abnormality test has been performed from the sensor signal test module,
   determine whether each of the received sensor signals is normal or abnormal,
   select a main sensor signal and a validity comparison signal among the sensor signals determined as being normal,
   determine validity of the selected main sensor signal, determined as being normal, based on comparison between the main sensor signal and the validity comparison signal which are selected among the sensor signals determined as being normal, and
   control an output of the selected main sensor signal based on the validity of the main sensor signal determined based on the comparison between the main sensor signal and the validity comparison signal selected among the sensor signals determined as being normal,
   wherein:
   the at least three or more sensors comprise first, second, and third sensors providing first, second, and third sensor signals, respectively,
   the first and second sensors are disposed at a dual die,
   the first and second sensor signals provided by the first and second sensors disposed at the dual die are sampled at a different cycle from each other,
   the second sensor signal provided by the second sensor disposed at the dual die and the third sensor signal provided by the third sensor disposed at the single die are sampled at a same cycle as each other.

2. The apparatus of claim 1, wherein the sensor signal selection module is further configured to compare sizes of the main sensor signal and the validity comparison signal.

3. The apparatus of claim 2, wherein the sensor signal test module receives first to third motor position sensor signals from first to third motor position sensors, performs an abnormality test on the received first to third motor position sensor signals, and provides the first to third motor position sensor signals, on which the abnormality test has been performed, to the sensor signal selection module.

4. The apparatus of claim 3, wherein the sensor signal selection module is configured to:
receive the first to third motor position sensor signals, on which the abnormality test has been performed, from the sensor signal test module, determine the received first to third motor position sensor signals as normal motor position sensor signals and abnormal motor position sensor signals, and, when all of the first to third motor position sensor signals are normal motor position sensor signals, select one of the normal motor position sensor signals as a main motor position sensor signal, and select the other two signals as validity comparison signals;
compare sizes of the main motor position sensor signal and the two validity comparison signals, and determine validity of the main motor position sensor signal according to a result of comparison; and
control an output of the main motor position sensor signal according to a result of determining the validity of the main motor position sensor signal.

5. The apparatus of claim 3, wherein:
from among the first to third motor position sensor signals, the first and second motor position sensor signals are provided from the first and second motor position sensors disposed in a dual die, and the third motor position sensor signal is provided from the third motor position sensor disposed in a single die; and
from among the first to third motor position sensor signals, the second and third motor position sensor signals are values sampled in the same cycle, and the first motor position sensor signal is a value sampled in a shorter cycle than the second and third motor position sensor signals.

6. The apparatus of claim 5, wherein phase differences according to arrangement positions of the dual die and the single die are reflected to the first and second motor position sensor signals and the third motor position sensor signal.

7. The apparatus of claim 5, wherein the sensor signal selection module is configured to:
receive the first to third motor position sensor signals, on which the abnormality test has been performed, from the sensor signal test module, determine the received first to third motor position sensor signals as normal motor position sensor signals and abnormal motor position sensor signals, and, when the first and second motor position sensor signals are normal motor position sensor signals according to a result of determining, select the first motor position sensor signal as a main motor position sensor signal, and select the second motor position sensor signal as a validity comparison signal;
compare sizes of the first and second motor position sensor signals, and determine that the first motor position sensor signal is valid when a difference between the sizes of the first and second motor position sensor signals is a preset validity value or less; and
output the first motor position sensor signal when the first motor position sensor signal is valid according to a result of determining the validity.

8. The apparatus of claim 5, wherein the sensor signal selection module is configured to:
receive the first to third motor position sensor signals, on which the abnormality test has been performed, from the sensor signal test module, determine the received first to third motor position sensor signals as normal motor position sensor signals and abnormal motor position sensor signals, and, when the first and third motor position sensor signals are normal motor position sensor signals according to a result of determining, select the first motor position sensor signal as a main motor position sensor signal, and select the third motor position sensor signal as a validity comparison signal;
determine that the first motor position sensor signal is valid when a difference between the sizes of the first and third motor position sensor signals is a preset validity value or less; and
output the first motor position sensor signal when the first motor position sensor signal is valid according to a result of determining the validity.

9. The apparatus of claim 5, wherein the sensor signal selection module is configured to:
receive the first to third motor position sensor signals, on which the abnormality test has been performed, from the sensor signal test module, determine the received first to third motor position sensor signals as normal motor position sensor signals and abnormal motor position sensor signals, and, when the second and third motor position sensor signals are normal motor position sensor signals according to a result of determining, select the third motor position sensor signal as a main motor position sensor signal, and select the second motor position sensor signal as a validity comparison signal;
compare sizes of the second and third motor position sensor signals, and determine that the third motor position sensor signal is valid when a difference between the sizes of the second and third motor position sensor signals is a preset validity value or less; and
output the third motor position sensor signal when the third motor position sensor signal is valid according to a result of determining the validity.

10. A method of processing a sensor signal, the method comprising:
receiving a sensor signal from each of at least three or more sensors;
performing an abnormality test on the received sensor signals;
determining whether each of the sensor signals on which the abnormality test has been performed is normal or abnormal;
selecting a main sensor signal and a validity comparison signal among the sensor signals determined as being normal;
determining validity of the selected main sensor signal, determined as being normal, based on comparison between the main sensor signal and the validity comparison signal which are selected among the sensor signals determined as being normal; and
controlling an output of the selected main sensor signal based on the validity of the main sensor signal determined based on the comparison between the main sensor signal and the validity comparison signal selected among the sensor signals determined as being normal,
wherein:
the at least three or more sensors comprise first, second, and third sensors providing first second, and third sensor signals, respectively,
the first and second sensors are disposed at a dual die,
the first and second sensor signals provided by the first and second sensors disposed at the dual die are sampled at a different cycle from each other,
the second sensor signal provided by the second sensor disposed at the dual die and the third sensor signal provided by the third sensor disposed at the single die are sampled at a same cycle as each other.

11. The method of claim 10, wherein the determining of the validity of the selected main sensor signal and the controlling of the output of the selected main sensor signal include:
receiving first to third motor position sensor signals, on which the abnormality test has been performed, determining whether each of the received first to third motor position sensor signals is a normal motor position sensor signal or an abnormal motor position sensor signal, and, when the first and second motor position sensor signals are normal motor position sensor signals according to a result of the determining, selecting the first motor position sensor signal as the main motor position sensor signal, and selecting the second motor position sensor signal as the validity comparison signal;
receiving the first and second motor position sensor signals, comparing sizes of the first and second motor position sensor signals, and determining that the first motor position sensor signal is valid when a difference between the sizes of the first and second motor position sensor signals is a preset validity value or less; and
outputting the first motor position sensor signal when the first motor position sensor signal is valid according to a result of the determining of the validity.

12. The method of claim 10, wherein the determining of the validity of the selected main sensor signal and the controlling of the output of the selected main sensor signal includes:
receiving first to third motor position sensor signals, on which the abnormality test has been performed, determining whether each of the received first to third motor position sensor signals is a normal motor position sensor signal or an abnormal motor position sensor signal, and, when the first and third motor position sensor signals are normal motor position sensor signals according to a result of the determining, selecting the first motor position sensor signal as the main motor position sensor signal, and selecting the third motor position sensor signal as the validity comparison signal;
receiving the first and third motor position sensor signals, comparing sizes of the first and third motor position sensor signals, and determining that the first motor position sensor signal is valid when a difference between the sizes of the first and third motor position sensor signals is a preset validity value or less; and
outputting the first motor position sensor signal when the first motor position sensor signal is valid according to a result of the determining of the validity.

13. The method of claim 10, wherein the determining of the validity of the selected main sensor signal and the controlling of the output of the selected main sensor signal includes:
receiving first to third motor position sensor signals, on which the abnormality test has been performed, determining the received first to third motor position sensor signals as normal motor position sensor signals and abnormal motor position sensor signals, and, when the second and third motor position sensor signals are normal motor position sensor signals according to a result of determining, selecting the third motor position sensor signal as a main motor position sensor signal, and selecting the second motor position sensor signal as a validity comparison signal;
receiving the second and third motor position sensor signals, comparing sizes of the second and third motor position sensor signals, and determining that the third motor position sensor signal is valid when a difference between the sizes of the second and third motor position sensor signals is a preset validity value or less; and
outputting the third motor position sensor signal when the third motor position sensor signal is valid according to a result of the determining of the validity.

14. A steering control apparatus comprising:
a sensor module configured to measure a position of a steering motor using at least three or more motor position sensors and generate motor position sensor signals on the basis of the measurement;
a sensor signal processing module configured to receive the motor position sensor signals from the sensor module, determine whether each of the received motor position sensor signals is normal or abnormal, select a main motor position sensor signal and a validity comparison signal among the motor position sensor signals determined as being normal, determine validity of the selected main motor position sensor signal, determined as being normal, based on comparison between the main motor position sensor signal and the validity comparison signal which are selected among the motor position sensor signals determined as being normal, and control an output of the selected main motor position sensor signal based on the validity of the main motor position sensor signal determined based on the comparison between the main motor position sensor signal and the validity comparison signal selected among the sensor signals determined as being normal; and
a steering motor control module configured to receive the output-controlled main motor position sensor signal from the sensor signal processing module, generate a steering assist force on the basis of the received output-controlled main motor position sensor signal, and use the generated steering assist force to control an operation of the steering motor,
wherein:
the at least three or more motor position sensors comprise first, second, and third motor position sensors providing first, second, and third motor position sensor signals, respectively,
the first and second motor position sensors are disposed at a dual die,
the first and second motor position sensor signals provided by the first and second motor position sensors disposed at the dual die are sampled at a different cycle from each other,
the second motor position sensor signal provided by the second motor position sensor disposed at the dual die and the third motor position sensor signal provided by the third motor position sensor disposed at the single die are sampled at a same cycle as each other.

15. The steering control apparatus of claim 14, wherein:
the sensor module measures a position of the steering motor through the first to third motor position sensors, generates the first to third motor position sensor signals on the basis of the measurement, and provides the generated first to third motor position sensor signals to the sensor signal processing module; and
the sensor signal processing module receives the first to third motor position sensor signals from the sensor module, determines whether each of the received first to third motor position sensor signals is normal or abnormal, selects the main motor position sensor signal based on the motor position sensor signals determined as being normal, determines validity of the selected main motor position sensor signal, and controls an output of the selected main motor position sensor signal.

16. The apparatus of claim 14, wherein the first sensor signal provided by the first sensor disposed at the dual die is sampled at a shorter cycle than the second sensor signal provided by the second sensor disposed at the dual die and the third sensor signal provided by the third sensor disposed at the single die.

17. The apparatus of claim 1, wherein the sensor signal selection module is configured:
   not to output the main sensor signal or to output a fault signal in response to a determination that the main sensor signal is invalid according to the validity of the main sensor signal determined based on the comparison between the main sensor signal and the validity comparison signal selected among the sensor signals determined as the normal sensor signal, and
   to output the main sensor signal in response to a determination that the main sensor signal is valid according to the validity of the main sensor signal determined based on the comparison between the main sensor signal and the validity comparison signal selected among the sensor signals determined as the normal sensor signal.

\* \* \* \* \*